United States Patent
Zhang et al.

(10) Patent No.: US 12,489,581 B2
(45) Date of Patent: Dec. 2, 2025

(54) REFERENCE SIGNALING SCHEMES IN WIRELESS COMMUNICATIONS

(71) Applicant: ZTE Corporation, Guangdong (CN)

(72) Inventors: Shujuan Zhang, Guangdong (CN); Bo Gao, Guangdong (CN); Zhaohua Lu, Guangdong (CN); Hao Wu, Guangdong (CN); Chuangxin Jiang, Guangdong (CN); Wenjun Yan, Guangdong (CN); Yu Pan, Guangdong (CN)

(73) Assignee: ZTE Corporation, Guangzhou (CN)

( * ) Notice: Subject to any disclaimer, the term of this patent is extended or adjusted under 35 U.S.C. 154(b) by 728 days.

(21) Appl. No.: 17/819,901

(22) Filed: Aug. 15, 2022

(65) Prior Publication Data

US 2022/0393831 A1 Dec. 8, 2022

Related U.S. Application Data

(63) Continuation of application No. PCT/CN2020/107887, filed on Aug. 7, 2020.

(51) Int. Cl.
*H04L 5/00* (2006.01)
(52) U.S. Cl.
CPC .................. *H04L 5/0053* (2013.01)
(58) Field of Classification Search
CPC ... H04L 5/0053; H04L 5/0007; H04L 5/0055; H04L 5/0044; H04B 7/0695
See application file for complete search history.

(56) References Cited

U.S. PATENT DOCUMENTS

| | | | | |
|---|---|---|---|---|
| 9,876,623 | B2* | 1/2018 | Papasakellariou | H04L 5/0057 |
| 11,337,203 | B2* | 5/2022 | Raghavan | H04L 5/0091 |
| 11,973,638 | B2* | 4/2024 | Cirik | H04L 41/0677 |
| 2019/0254110 | A1* | 8/2019 | He | H04L 41/0896 |
| 2020/0045709 | A1 | 2/2020 | Seo et al. | |
| 2020/0100311 | A1 | 3/2020 | Cirik et al. | |
| 2020/0229161 | A1* | 7/2020 | Raghavan | H04W 24/10 |
| 2020/0267750 | A1* | 8/2020 | Park | H04W 72/0446 |
| 2020/0280416 | A1 | 9/2020 | Gao et al. | |
| 2020/0350967 | A1* | 11/2020 | Xu | H04B 7/022 |
| 2021/0028843 | A1* | 1/2021 | Zhou | H04L 5/0053 |
| 2021/0136741 | A1* | 5/2021 | Onggosanusi | H04W 72/23 |
| 2021/0176031 | A1* | 6/2021 | Babaei | H04W 76/30 |

(Continued)

FOREIGN PATENT DOCUMENTS

| | | |
|---|---|---|
| CN | 110535598 A | 12/2019 |
| WO | 2020/001577 A1 | 1/2020 |

OTHER PUBLICATIONS

Co-Pending CN Application No. 202080104137.5, 2nd Office Action dated May 24, 2025, 28 pages with machine translation.

(Continued)

*Primary Examiner* — Hassan A Phillips
*Assistant Examiner* — Prenell P Jones
(74) *Attorney, Agent, or Firm* — Perkins Coie LLP

(57) ABSTRACT

A wireless communication method is described. The method is performed by a user device and comprises: determining a list of one or more reference signals; receiving, during a first time unit, a first signaling that includes a state; determining a relationship between a reference signal corresponding to the state and the list; and determining, based on the relationship, a second time unit associated with the state or the first signaling.

17 Claims, 20 Drawing Sheets

(56) References Cited

U.S. PATENT DOCUMENTS

| | | | | |
|---|---|---|---|---|
| 2021/0400555 | A1* | 12/2021 | Park | H04W 36/0077 |
| 2022/0039163 | A1* | 2/2022 | Park | H04L 5/0091 |
| 2022/0116183 | A1* | 4/2022 | Gao | H04L 1/1896 |
| 2022/0124739 | A1* | 4/2022 | Bai | H04W 72/542 |
| 2022/0124777 | A1* | 4/2022 | Kang | H04W 72/21 |
| 2022/0173788 | A1* | 6/2022 | Kang | H04L 1/1864 |
| 2022/0256573 | A1* | 8/2022 | Frenne | H04W 72/23 |
| 2022/0294514 | A1* | 9/2022 | Kang | H04B 7/06964 |
| 2023/0247502 | A1* | 8/2023 | Cirik | H04W 36/06 375/262 |
| 2023/0284200 | A1* | 9/2023 | Cirik | H04L 5/0023 375/267 |
| 2024/0057162 | A1* | 2/2024 | Park | H04L 5/0051 |
| 2024/0259067 | A1* | 8/2024 | Kwak | H04B 7/063 |

OTHER PUBLICATIONS

Ericsson, "On active TCI state switching in NR-U," 3GPP TSG-RAN WG4 Meeting #92-Bis, Chongqing, China, R4-1912084, 6 pages, Oct. 14-18, 2019.
Etsi, "Requirements for support of radio resource management," 3GPP TS 38.11 Version 16.4.0 Release 16. 2020, 1465 pages.
ISA, International Search Report for International Application No. PCT/CN2020/107887, Mail Date May 6, 2021. 8 pages.
Co-Pending CN Application No. 202080104137.5, Office Action dated Sep. 13, 2024, 15 pages with machine translation.
Mediatek Inc. "draftCR on TCI state switch (section 8.10)" 3GPP TSG-RAN WG4 Meeting #94-e-Bis R4-2005430, 4 pages.
Qualcomm, "CR for correction to MAC-CE based TCI State switch timeline (Clause 8.10.3)" 3GPP TSG-RAN WG4 Meeting #95-e R4-2006177, 3 pages.
Co-Pending EP Application No. 20947959.1, Extended European Search Report dated Dec. 7, 2022, 11 pages.
Huawei, et al. "Discussion on spatial relation switch for uplink" 3GPP TSG-RAN WG4 Meeting #95-e Electronic Meeting, May 25-Jun. 5, 2020, R4-2007749, 5 pages.
Intel Corp. "[95e][222] NR_RRM_Enh_RRM_Part_1" 3GPP TSG-RAN WG4 Meeting #95-e, Electronic Meeting, May 25-Jun. 2, 2020, R4-2009034, 55 pages.
Nokia et al. "Enhancements on Multi-beam Operation" 3GPP TSG RAN WG1 #105-e R1-2105273 e-Meeting, May 10-May 27, 2021, 44 pages.
ZTE "Enhancements on Multi-beam Operation" 3GPP TSG RAN WG1 Meeting #105-e R1-2104585 e-Meeting, May 10-27, 2021, 24 pages.
Qualcomm Inc. "Enhancements on Multi-beam Operation" 3GPP TSG RAN WG1 Meeting #105-e R1-2104654, May 10-27, 2021, 15 pages.
Vivo "Further discussion on multi beam enhancement" 3GPP TSG RAN WG1 #105-e R1-2104343 e-Meeting, May 10-27, 2021, 33 pages.
Vivo "Feature lead summary on Enhancements on Multi-TRP inter-cell operation" 3GPP TSG RAN WG1 #102-e- R1-200xxxx, e-Meeting, Aug. 17-28, 2020, 10 pages.
Ericsson "Session Notes for 7.2.10 (Maintenance of Multi-RAT Dual-Connectivity and Carrier Aggregation Enhancements (LTE, NR))" 3GPP TSG-RAN WG1 Meeting #105-e Tdoc R1-2106228 e-Meeting, May 10-May 27, 2020, 2 pages.
Intel Corp. "Summary of AI: 8.1.2.4 Enhancements on HST-SFN deployment" 3GPP TSG RAN WG1 Meeting #102-e R1-200xxxx, e-Meeting, Aug. 17-28, 2020, 13 pages.
LG Electronics "Enhancements on beam management for multi-TRP" 3GPP TSG RAN WG1 #105-e R1-2105781, e-Meeting, May 10-27, 2021, 12 pages.
Ericsson "Enhancements on Multi-beam Operation" 3GPP TSG-RAN WG1 Meeting #105-e Tdoc R1-2105828, e-Meeting, May 10-27, 2021, 31 pages.
Samsung "Moderator summary for multi-beam enhancement: proposal categorization" 3GPP TSG RAN WG1 #102-e R1-2006985, e-Meeting, Aug. 17-28, 2020, 27 pages.
Samsung "Moderator summary#2 for multi-beam enhancement: proposal categorization" 3GPP TSG RAN WG1 #102-e, R1-2007189, e-Meeting, Aug. 17-28, 2020, 27 pages.
Ericsson "Multi-RAT Dual-Connectivity and Carrier Aggregation enhancements (LTE, NR)" 3GPP TSG RAN meeting #88-e RP-200779, Electronic meeting, Jun. 29-Jul. 3, 2020, 57 pages.
Co-Pending EP Application No. 20947959.1, Article 94 Communication dated May 27, 2025, 5 pages.
CNIPA, Notice of Grant for Chinese Application No. 202080104137.5, mailed on Aug. 26, 2025, 9 pages with unofficial English translation.

* cited by examiner

REFERENCE SIGNALING SCHEMES IN WIRELESS COMMUNICATIONS

CROSS-REFERENCE TO RELATED APPLICATION

This application claims priority to International Application No. PCT/CN2020/107887, filed on Aug. 7, 2020, the disclosure of which is hereby incorporated by reference herein in its entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for control information configuration in wireless communications.

In one aspect, a wireless communication method is disclosed. The wireless communication method is performed by a user device and comprises: determining a list of one or more reference signals; receiving, during a first time unit, a first signaling that includes a state; determining a relationship between a reference signal corresponding to the state and the list; and determining, based on the relationship, a second time unit associated with the state or the first signaling.

In another aspect, a wireless communication method is disclosed. The wireless communication method is performed by a user device and comprises: determining a list of one or more reference signals; receiving, during a first time unit, a first signaling that includes a state; determining a type of the state based on whether a channel status information about a resource corresponding to the state has been reported by the user device; and determining, based on the type of the new state, a second time unit associated with the state.

In another aspect, a wireless communication method is disclosed. The wireless communication method is performed by a network device and comprises: determining a list of one or more reference signals; transmitting, during a first time unit, to a user device, a first signaling that includes a state; and determining a relationship between a reference signal corresponding to the state and the list; and determining, based on the relationship, a second time unit associated with the state or the first signaling.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

These, and other features, are described in the present document.

DETAILED DESCRIPTION

The disclosed technology provides implementations and examples of reference signaling configuration schemes in wireless communications. While 5G terminology is used in some cases to facilitate understanding of the disclosed techniques, which may be applied to wireless systems and devices that use communication protocols other than 5G or 3GPP protocols.

Figure 1:
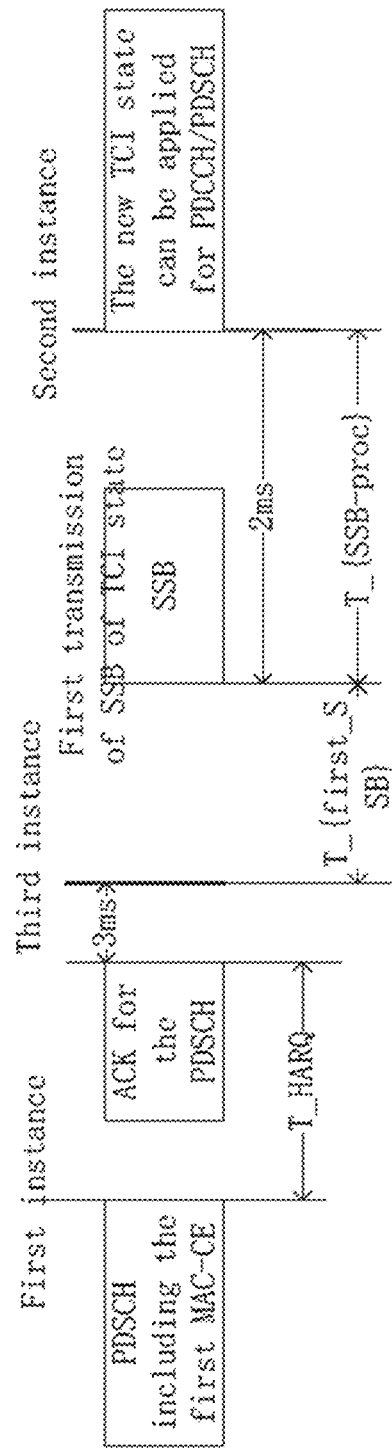
FIGS. 1 and 2 shows operations of a user device in case that a new TCI (Transmission Configuration Indication) state is applied after a transmission of a synchronization signal block (SSB) corresponding to the new TCI state, wherein the new TCI state is included in a first MAC-CE (MAC-Control Element).

FIG. 1 shows operations by a user device to apply or update a TCI state for wireless communications. A first MAC-CE can update TCI (Transmission Configuration Indicator) state for PDSCH (Physical Downlink Shared Channel)/PDCCH (Physical Downlink Control Channel)/others. The UE receives a PDSCH including the first MAC-CE at a first instance in a first time unit. A time instance corresponds to a time point and a time unit corresponds to a time interval including a time point. A time unit includes one of a slot, a sub-slot, an OFDM symbol, or a sub-frame.

The UE sends the acknowledgement (ACK) for the PDSCH. T_HARQ in FIG. 1 indicates time period between when the UE receives the PDSCH and when the UE sends the ACK for the PDSCH. After sending the ACK for the PDSCH, the third instance indicates the minimum delay that the UE can apply the new TCI state. For example, it means the delay that until when the first MAC CE command is decoded by the UE. If the UE is with a higher capability, the UE can apply the new TCI state starting from the third time unit including the third instance. If the UE is with a low capability, the UE needs to start to apply the new TCI state after the third instance and before the second time instance. $T_{first\text{-}SSB}$ is the time duration for the first transmission of SSB of the new TCI state after the UE has decoded the MAC-CE and it is between the third instance and the first SSB transmission. The SSB of the new TCI state is received in the first transmission of SSB. The SSB of the new TCI state is the QCL-TypeA or QCL-TypeC to the new TCI state. The UE needs to have the capability to apply the new TCI state before the second time unit including the second instance. The TCI state updating speeds up beam switching, but the interval between the first instance and the second instance is quite long. Referring to FIG. 1, the interval includes $T_{first\_SSB}$ which is the duration between the third instance and the first transmission of the SSB corresponding to the new TCI state. When the period of SSB is long such as 80 ms, the interval will be too long, then gNB can't switch beam in time.

Figure 2:
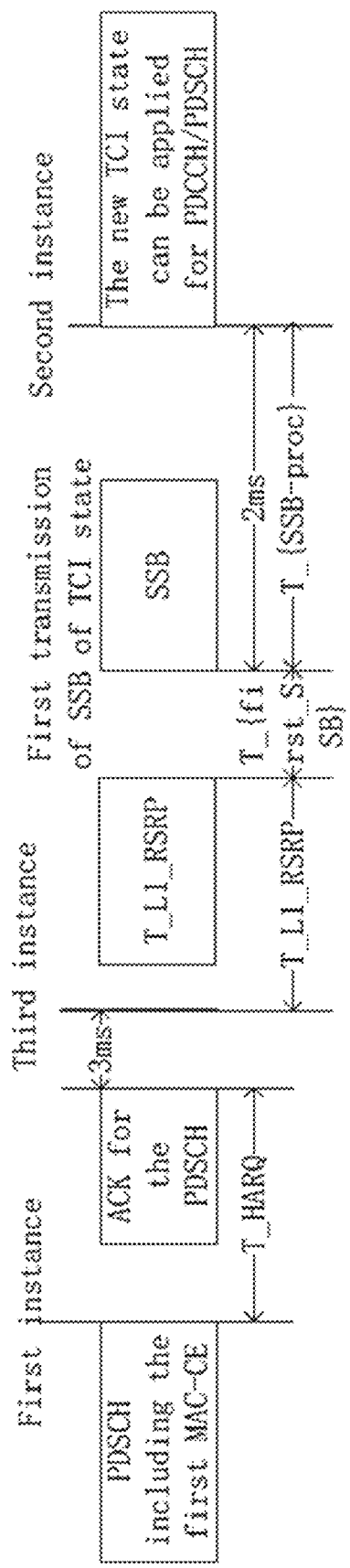

FIG. 1 shows the delay of applying the new TCI state when the TCI state is known. The delay of applying the new TCI state will be longer when the new TCI state is unknown as shown in FIG. 2. Compared with FIG. 1, the interval between the first instance in the first time unit (when the UE receives a PDSCH including the first MAC-CE) and the second instance in the second time unit (when the new TCI state can be applied for PDSCH/PDCCH) includes an additional duration for measuring L1-RSRP (reference signal received power) since the UE hasn't reported a L1-RSRP for the new TCI state before the UE received the first MAC-CE. This additional duration is very long, for example, 7s.

The disclosed technology provides various implementations that can reduce the interval between the first instance in the first time unit (when the UE receives a signaling, for example, a PDSCH including the first MAC-CE) and the second instance in the second time unit (the UE has the ability to apply the new TCI state for PDSCH/PDCCH/others no later than the second time unit).

Example 1

Figure 3:
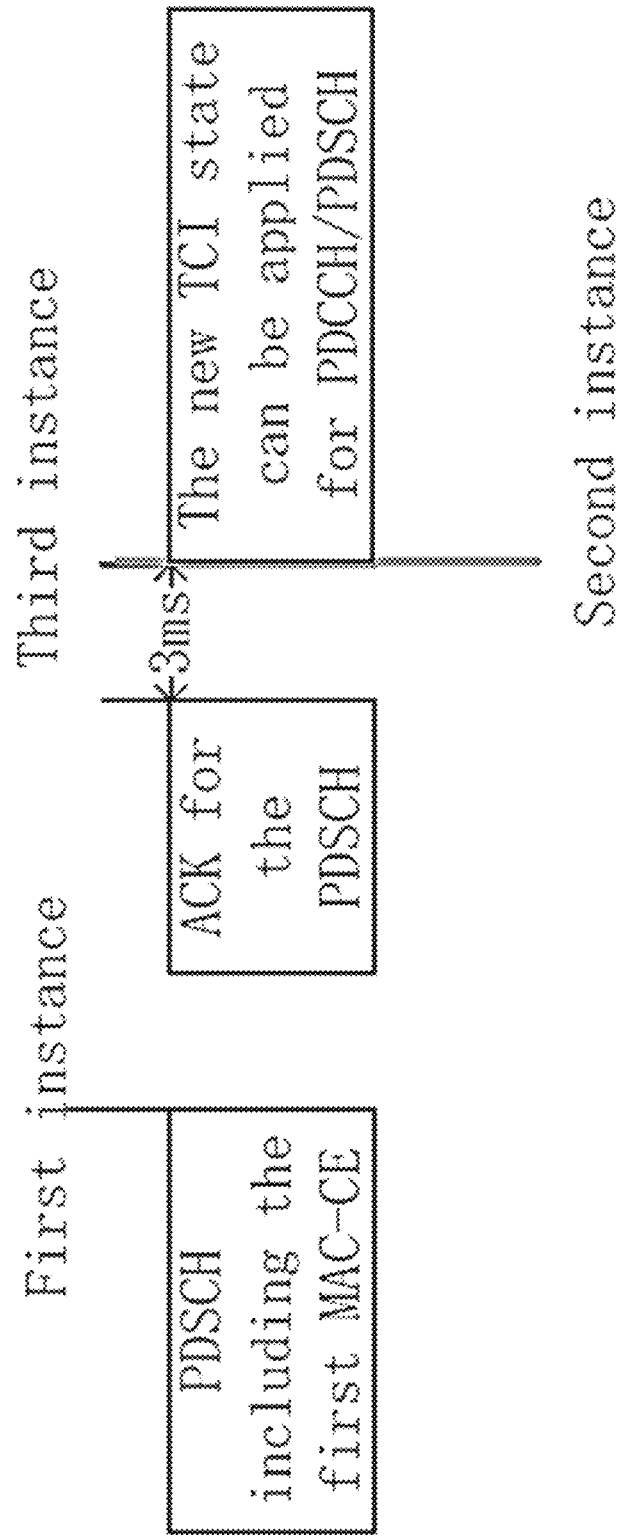
FIGS. 3 and 4 show operations of a user device based on some implementations of the disclosed technology in case that a new TCI state is applied without waiting for a transmission of a SSB corresponding to the new TCI state, wherein the new TCI state is included in a first MAC-CE.
Figure 4:
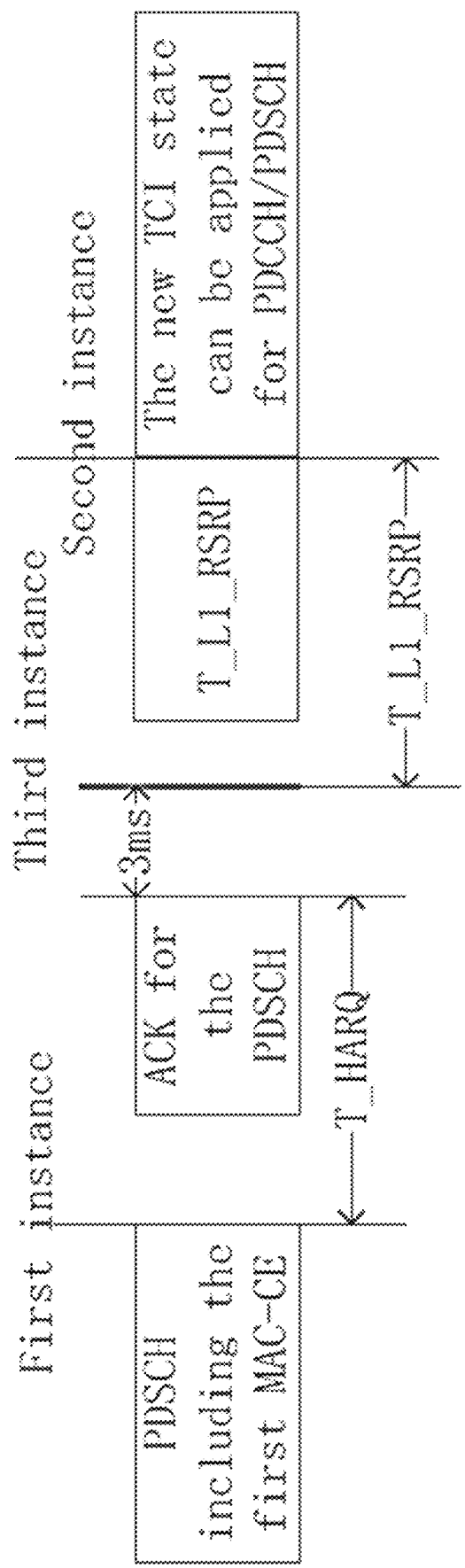

In Example 1, the UE determines a SSB list (e.g., a list of SSBs, where the first type of reference comprise SSB) before the UE receives a first MAC-CE. Although this example is described for a case that the UE determines a SSB list, the disclosed technology is not limited to the SSB list and can be applied for other reference signals. When the SSB corresponding to a new TCI state activated by the first MAC-CE is in the SSB list, the new TCI state can be applied for an element, e.g., PDSCH/PDCCH/PUSCH/PUCCH/reference signals, without waiting for the first transmission of the SSB corresponding to the new TCI state. FIGS. 3 and 4 show operations of a user device based on some implementations of the disclosed technology, in case that the SSB corresponding to a new TCI state is included in the SSB list such that a new TCI state is applied without waiting for a transmission of a SSB corresponding to the new TCI state. FIG. 3 corresponds to a case when the new TCI state is known and FIG. 4 corresponds to a case when the new TCI state is unknown. Whether the new TCI state is known or unknown can be determined based on whether predetermined conditions(s) are met. Example 2 of this patent document will be discussed regarding when the new TCI state is determined as known or unknown. Applying a new TCI state for the elements means one of following: the new TCI state is activated TCI state of the element; mapping between the TCI states in the MAC-CE and codepoints in a DCI is applied, the codepoint is used to indicates the TCI state of the elements; the new TCI state is candidate TCI state for the elements; the UE has the capability to apply the new TCI state for the elements. the UE has the capability to receive a PDCCH with the new TCI state for the element, the state is applied for an element starting from a time unit that is no later than the second time unit, the state is determined as a candidate state for the element starting from a time unit that is no later than the second time unit, the user device has the capability to receives a PDCCH with the state for the element no later than the second time unit, receiving the element with the state starting from a time unit that is no later than the second time unit, receiving a PDCCH with the state for the elements starting from a time unit that is no later than the second time unit When the SSB corresponding to a new TCI state is not included in the SSB list, the new TCI state can be applied for PDSCH/PDCCH/PUSCH/PUCCH/reference signal after waiting for the first transmission the SSB corresponding to the new TCI state as shown in FIGS. 1 and 2. The SSB corresponding to a TCI state includes the SSB which is in the TCI state or QCLed to the TCI state, or the SSB corresponding to a TCI state includes the SSB which is QCLed with respect to QCL-TypeA or QCL-TypeC to the TCI state. Thus, the SSB is in the TCI state or the SSB is the reference QCL-RS of the reference signal resource in the TCI state.

For example, if the new TCI state is known, the UE should be able to apply the new TCI state for PDSCH/PDCCH/PUSCH/PUCCH/reference signal no later in slot $k+T_{HARQ}+(3 \text{ ms}+TO_k*(T_{first\text{-}SSB}+T_{SSB\text{-}proc}))/NR$ slot length (e.g., the second time unit). If the SSB corresponding to the new TCI state in the first MAC-CE is in the SSB list, $TO_k$, is 0 as shown in FIG. 3, otherwise $TO_k$ is 1 as shown in FIG. 1. The PDSCH including the first MAC-CE is in the slot k. $T_{HARQ}$ is the interval between the slot k and the HARQ-ACK for the PDSCH including the first MAC-CE as shown in FIG. 1. $T_{first\text{-}SSB}$ is the time to the first transmission of SSB of the new TCI state after the first MAC CE command is decoded by the UE. $T_{SSB\text{-}proc}$ is 2 ms. In FIG. 3, the new TCI state activated by the first MAC-CE can be applied for PDSCH/PDCCH/PUSCH/PUCCH/reference signal starting from the first slot that is after slot $n+3N_{slot}^{subframe,\mu}$ where $\mu$ is the SCS configuration for the PUCCH which includes the HARQ-ACK for PDSCH comprising the first MAC-CE. The HARQ-ACK for the PDSCH including the first MAC-CE is sent in slot n.

If the new TCI state is unknown, the new TCI state can be applied for PDSCH/PDCCH/PUSCH/PUCCH/reference signal no later than in slot $k+T_{HARQ}+(3 \text{ ms}+T_{L1\text{-}RSRP}+TO_{uk}*$ $(T_{first\text{-}SSB}+T_{SSB\text{-}proc}))$/NR slot length. If the SSB corresponding to the new TCI state in the first MAC-CE is in the SSB list, $TO_{uk}$ is 0 as shown in FIG. 4, otherwise $TO_{uk}$ is 1 as shown in FIG. 2. $T_{first\text{-}SSB}$ is the time to first transmission of SSB of the new TCI state after MAC CE command is decoded by the UE if the new TCI state doesn't involve QCL-TypeD, $T_{first\text{-}SSB}$ is to the first transmission of SSB of the new TCI state after at least one of L1-RSRP (reference signal received power), L1-SINR (signal-to-interference-plus-noise ratio), PMI (Precoding Matrix Indicator), or L3-RSRP measurement, when the new TCI state involves QCL-TypeD as shown in FIG. 2. $T_{L1\text{-}RSRP}$ is the time for L1-RSRP measurement for Rx beam refinement and $T_{L1\text{-}RSRP}$ also can be replaced by the time for/L1-SINR/PMI/L3-RSRP measurement for Rx beam refinement when the new TCI state doesn't involves QCL-TypeD, $T_{L1\text{-}RSRP}$ is 0.

The following implementations describe various ways for the UE to get the SSB list:

Implementation 1: The UE determines the SSB list based on configuration from gNB. For example, the gNB configures the SSB list to a UE. The gNB can configure the SSB list to a UE through a RRC signaling or by a second MAC-CE. The list for the MAC-CE and the list for the RRC signaling can be same as each other. In some other implements, the list for the MAC-CE and the list for the RRC signaling can be different from each other. In some implementations, the second MAC-CE can be a same one as the first MAC-CE as shown in FIGS. 1 to 4, which is used for updating the TCI state of channel. In some implementations, the second MAC-CE can be a separate one from the first MAC-CE. A new SSB in the second MAC-CE will be added to the SSB list starting from the second instance in a second time unit. A new TCI state activated by the second MAC-CE can be applied for PDSCH/PDCCH/others no later than the second time unit including the second instance when the first MAC-CE and the second MAC-CE is the same MAC-CE.

Figure 5:
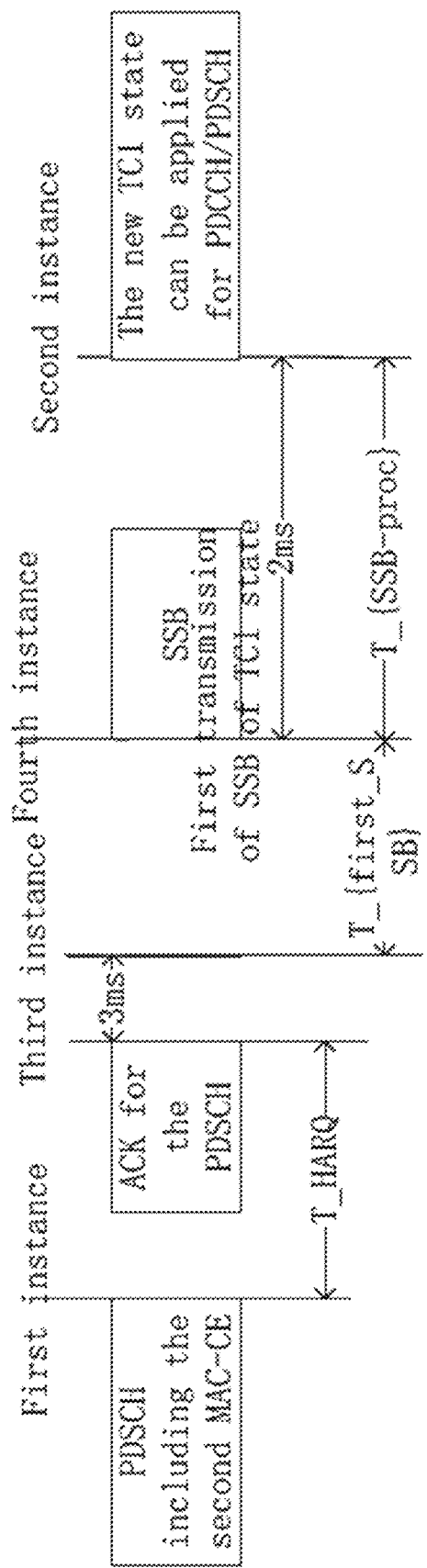
FIGS. 5 and 6 show examples that a new TCI state activated by a second MAC-CE is added to an SSB list at a second instance after waiting for a first transmission of a corresponding SSB.
Figure 6:
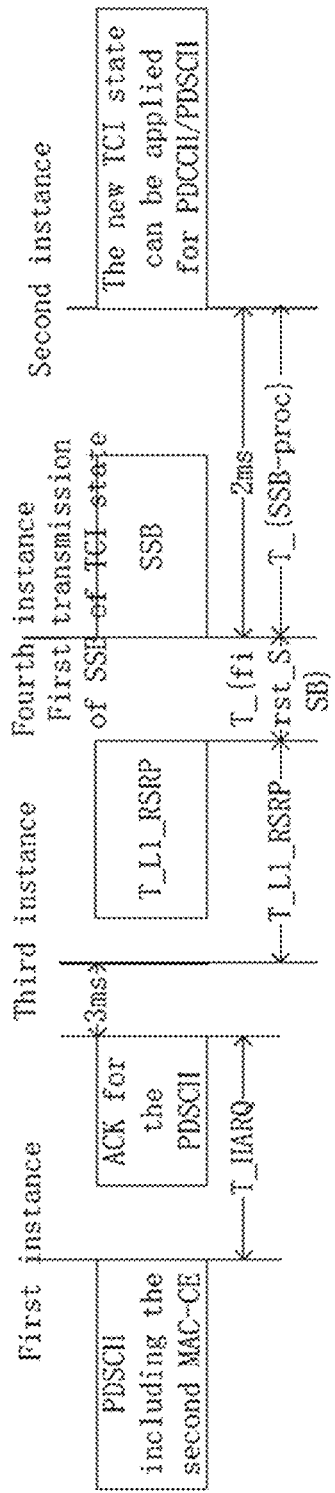

FIGS. 5 and 6 show examples that a new SSB activated by a second MAC-CE is added to the SSB list at a second instance during the second time unit after waiting for a first transmission of a corresponding SSB. The SSB list can be updated many times and the implementations as shown in FIGS. 5 and 6 can be used to update the SSB list. The updating can include configuring the SSB list and/or updating the already existing SSB list. In some implementations, adding the SSB in the second MAC-CE to the SSB list means that the SSB has been tracking by the UE.

Figure 8:
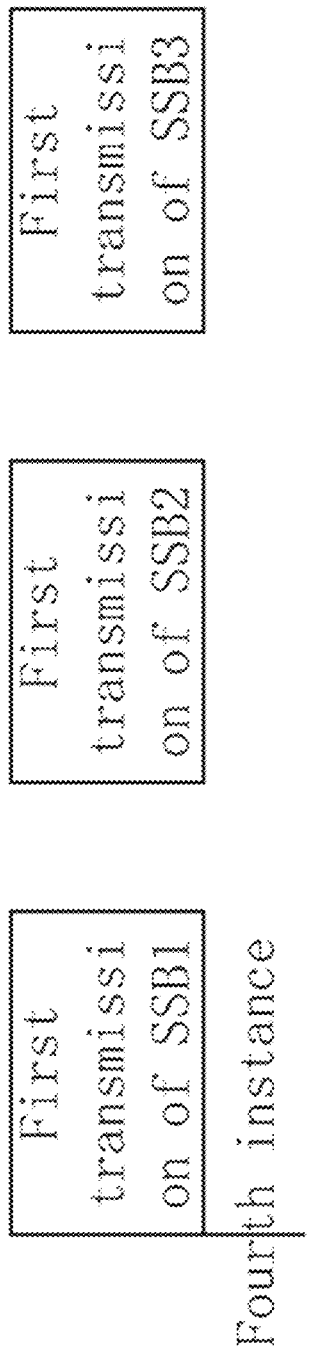
FIG. 8 illustrates that a fourth instance corresponds to when a user device receives a first transmission of SSB1 that occurs prior to first transmissions of SSB2 and SSB3.
Figure 9:
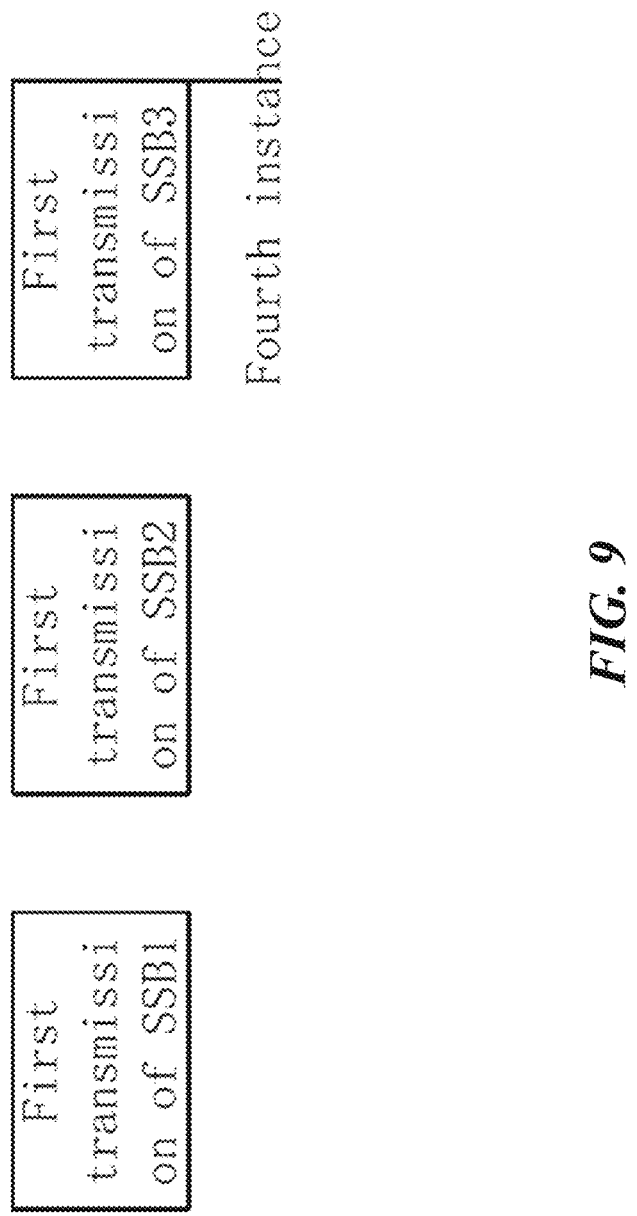
FIG. 9 illustrates that a fourth instance corresponds to when a user device receives a first transmission of SSB3 that occurs later than first transmissions of SSB1 and SSB2.

If an old SSB of the SSB list in the SSB list is not in the second MAC-CE, the old SSB will be deleted from the SSB list starting from the fourth instance (or from the third instance or from second instance) as shown in FIG. 5 or 6. The fourth instance is when the UE receives the first transmission of a SSB corresponding to a new SSB in the second MAC-CE. If there are more than one new SSBs in the second MAC-CE, the fourth instance may correspond to when the UE receives the earliest one of the new SSBs or when the UE receives the last one of the new SSBs. FIG. 8 illustrates that the fourth instance is when the UE receives the first transmission of SSB1 prior to the first transmissions of SSB2 and SSB3. FIG. 9 illustrates that the fourth instance is when the UE receives the first transmission of SSB3 after the first transmissions of SSB1 and SSB2. In FIG. 8 and FIG. 9, the new SSB set is {SSB1,SSB2,SSB3}, the old SSB4 will be deleted from the SSB list from the fourth instance (or from the fourth time unit including the fourth instance).

Figure 7:
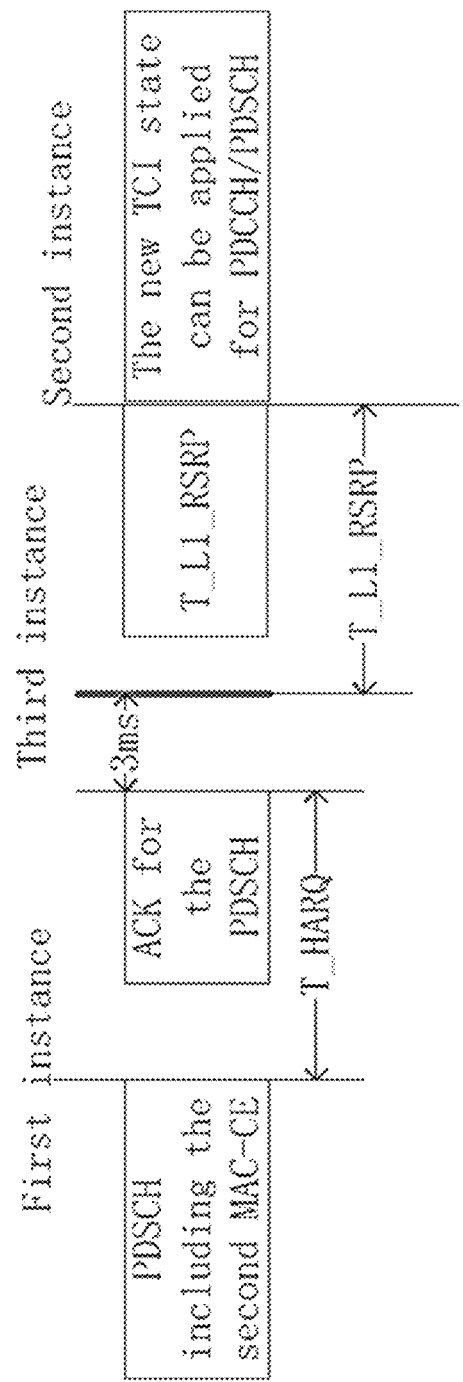
FIG. 7 shows an example that a new TCI state activated by a second MAC-CE is added to a SSB list at a second instance without waiting for a first transmission of a corresponding SSB.

FIG. 7 shows an example that a new SSB activated by a second MAC-CE is added to a SSB list at a second instance without waiting for a first transmission of a corresponding SSB. In FIG. 7, the SSB has been tracked by the UE in duration of L1-RSRP before the MAC-CE. Thus, the UE doesn't need to wait for the first transmission of the SSB for tracking the SSB. If the UE measures the SSB corresponding to the new TCI state in the period of $T_{L1\text{-}RSRP}$ and report the L1-RSRP/L1-SINR/L3-RSRP/L3-SINR/PMI for the SSB as in FIG. 7, the new SSB will be added to the SSB list from the second instance without waiting for the first transmission of the SSB after $T_{L1\text{-}RSRP}$, i.e $TO_{uk}$ is 0. If an old SSB in the SSB list isn't in the second MAC-CE, the old SSB will be deleted from the SSB list starting from the second instance.

In some implementations, the second MAC-CE and the first MAC-CE share the same LCID (logical channel ID). Thus, the second MAC-CE and the first MAC-CE can be the same MAC-CE. For example, the same MAC-CE includes 12 TCI state. The first 8 TCI states in the same MAC-CE is for TCI state set of PDSCH. In this case, the first 8 TCI states are mapped to the codepoint of TCI field in DCI. The SSB of the 12 TCI state is in the SSB list. For example the first 8 TCI states correspond to {SSB1,SSB2}, the last 4 TCI states correspond to {SSB3,SSB6,SSB16,SSB13}, then the SSB list includes {SSB1,SSB2,SSB3,SSB6,SSB16,SSB13}. Thus, the SSB activated by the second MAC-CE can be directly in the second MAC-CE, or a new TCI state is in the second MAC-CE and the SSB corresponding to a new TCI state will be added to the SSB list.

Figure 10:
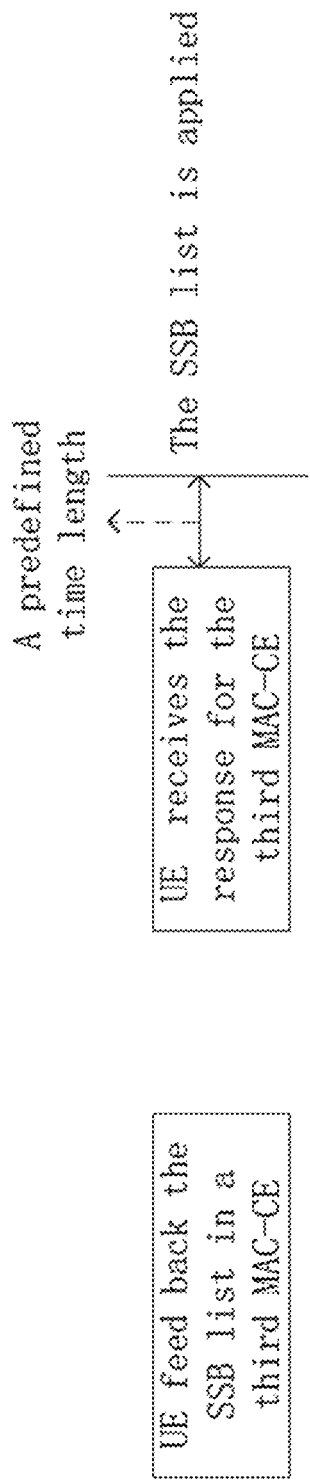
FIGS. 10 and 11 illustrate that a user device configures an SSB list based on information reported by the user device.
Figure 11:
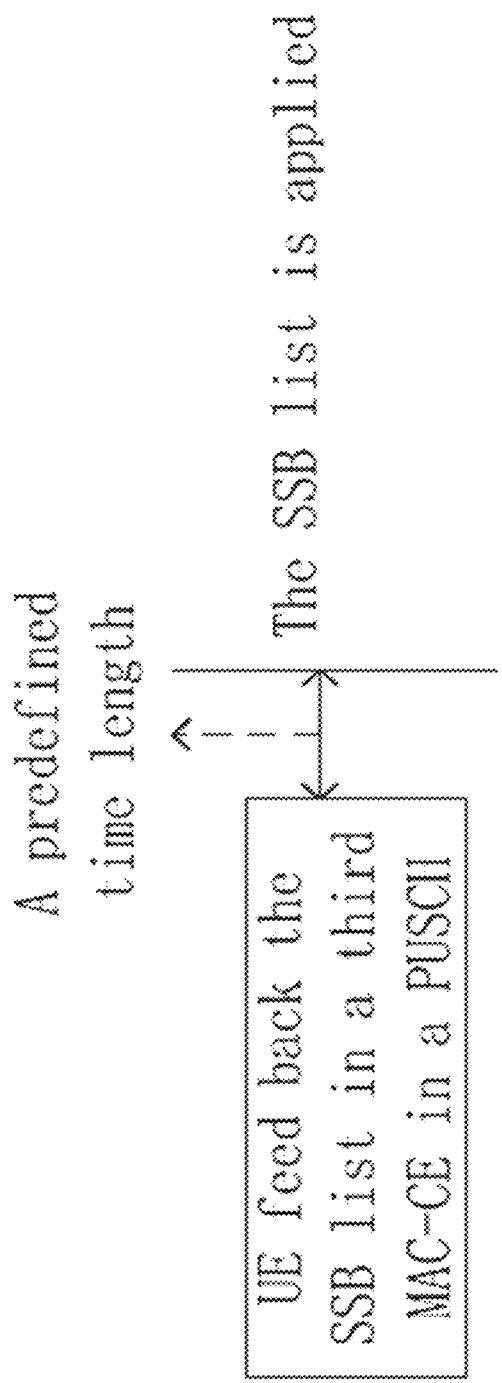

Implementation 2: The UE determines the SSB list based on information reported by the UE. The UE provides the SSB list to the gNB. FIGS. 10 and 11 illustrate that the UE determines the SSB list based on the information reported by the UE. In the implementation as shown in FIG. 10, the new SSB list will be applied starting from a predefined time length after the UE receives a response from the gNB. In the implementation as shown in FIG. 11, the new SSB list will be applied starting from a predefined time length after the UE feeds back the SSB list without waiting the response from the gNB. The UE feeds back the SSB list in a third MAC-CE included in a PUSCH in FIG. 10 or FIG. 11. In some implementations, the UE can also feed back the SSB list in a UCI.

Implementation 3: The UE determines the SSB list based on CSI reporting that the UE fed back. For example the UE maintains the SSB list, when the UE feeds back a SSBRI (SSB resource indicator) in a CSI reporting, the UE will add the SSB corresponding to the SSBRI to the SSB list from a fifth instance to sixth instance. The sixth instance is after the fifth instance and the interval between the fifth instance and the sixth instance is predefined, or determined based on the UE capability. The UE will delete the SSB corresponding to the SSBRI from the SSB list after sixth instance. The fifth instance is one of following: the instance when the UE report the SSBRI, the instance of the last transmission of the SSB corresponding to the SSBRI before the UE reports the SSBRI, the instance of the last transmission of the SSB regardless the UE whether report the SSBRI for the SSB, the instance after a predefined time after the UE report the SSBRI, the instance after a predefined time after the UE receive the response from gNB for the reporting of the SSBRI, or the instance after a predefined time after of the last transmission of the SSB corresponding to the SSBRI. The SSBRI can be a SSBRI reported in a normal CSI reporting. The SSBRI can also be a SSBRI reported in PRACH process. The SSBRI can also be a SSBRI reported in a beam failure request. As shown in FIGS. 2, 4, 6, and 7, the SSB will be added to the SSB list after period $T_{L1\text{-}RSRP}$.

Implementation 4: The UE determines the SSB list based on the active TCI state of a CORESET. The SSB list includes the SSB corresponding to the activated TCI state of a CORESET. When a new TCI state of a CORESET is activated, the SSB corresponding to the new TCI state of the CORESET be added to the SSB list. In some implementations, when an old TCI state of a CORESET is deactivated, the SSB corresponding to the old TCI state of the CORESET be deleted from the SSB list. In some other implementations, when an old TCI state of a CORESET is deactivated and the SSB corresponding to the old TCI state of the CORESET doesn't correspond to any active TCI state of PDSCH/other CORESETs, the SSB corresponding to the old TCI state of the CORESET will be deleted from the SSB list.

Implementation 5: The UE determines the SSB list based on the active TCI state of PDSCH. The SSB list includes the SSB corresponding to the activated TCI state of PDSCH which is activated by a MAC-CE. When a new TCI state is activated for PDSCH, the SSB corresponding to the new TCI state be added to the SSB list. When an old TCI state for PDSCH is deactivated, the SSB corresponding to the old TCI state be added to the SSB list. In some other implementations, when an old TCI state for PDSCH is deactivated and the SSB corresponding to the old TCI state doesn't correspond to any activated TCI state of PDSCH/CORESET, the SSB corresponding to the old TCI state may be added to the SSB list.

Implementation 6: The UE determines the SSB list based on the UE capability. The UE reports its capability for tracking the maximum number (Z) of SSBs in the SSB list. If the number of SSBs corresponding to the TCI state in the first MAC-CE is smaller than or equal to the UE capability, a new TCI state activated by the first MAC-CE can be applied for PDSCH/PDCCH/PUCCH/PUSCH/reference signal without waiting for the SSB as shown in FIG. 3 or FIG. 4. For example, the new TCI state activated by the first MAC-CE can be applied for PDSCH/PDCCH/PUSCH/PUCCH/reference signal starting from the first slot that is after slot $n+3N_{slot}^{subframe,\mu}$ where $\mu$ is the SCS configuration for the PUCCH including the HARQ-ACK for PDSCH comprising the first MAC-CE. If the number of SSBs corresponding to the TCI state in the first MAC-CE is larger than the UE capability (Z), the first Z TCI states activated by the first MAC-CE can be applied for PDSCH/PDCCH/PUCCH/PUSCH/reference signal without waiting for the SSB as shown in FIG. 3 or FIG. 4. The remaining TCI state activated by the first MAC-CE can be applied for PDSCH/PDCCH/PUCCH/PUSCH after waiting for the SSB as shown in FIG. 1 or FIG. 2. The UE will always track the maximum number of SSBs in the SSB list.

Implementation 7: The UE configures the SSB list based on the UE capability. The UE reports its capability for tracking the maximum number (Z) of SSBs in the SSB list. If the sum of the number X of new SSBs corresponding to the new TCI state in the first MAC-CE and the number Y of SSBs included in the SSB list before the first signaling is smaller than or equal to the UE capability, a new TCI state activated by the first MAC-CE can be applied for PDSCH/PDCCH/PUCCH/PUSCH/reference signal without waiting for the SSB as shown in FIG. 3 or FIG. 4. If the sum is larger than the UE capability, the new TCI state corresponding to the last X+Y-Z new SSB will applied for PDSCH/PDCCH/PUCCH/PUSCH/reference after waiting for the first transmission of the new SSB as shown in FIG. 1 or FIG. 2. The other new TCI state will be applied for PDSCH/PDCCH/PUCCH/PUSCH without waiting for the first transmission of the new SSB as shown in FIG. 3 or FIG. 4.

In some implementations, the descriptions above can be applied for determining the delay of applying the new TCI state in the first signaling. In some other implements, the above description can be applied for determining the delay of applying any TCI state in the first signaling regardless it is new or old.

In some implementations, the maximum number of SSBs in the SSB list is based on the UE capability.

In some implementations, a SSB in the SSB list is associated with a first parameter which include at least one of PCI (Physical cell identity), frequency location, measureObjectID. The SSB list can include SSBs with different first parameter.

In some implementations, the SSB list is associated with a second parameter such that different SSB lists are associated with different second parameters and different second parameters are associated with different SSB lists. The second parameter includes at least one of following: a serving cell, a CORESET pool index, or serving cell group, a UE.

In some implementations, when the second parameter corresponding to SSB list is deactivated or is reconfigured, the SSB list will be empty.

In some implementations, before RRC-connected (for example before the UE is configured with C-RNTI), the SSB list only includes the SSB corresponding to the SSB which is chosen by the UE in the PRACH process.

Although the example above has been described with the TCI state, the state included in the first MAC-CE is not limited thereto. In some implementation, the state in the first MAC-CE can include one of TCI (transmission configuration indication) state, a state of a selected SRS resource set, or a state of spatial relationship information. In some implementations, the new state includes one of a QCL reference signal or a spatial relationship reference signal. In some implementation, the state in the first MAC-CE can include a state of a selected SRS resource set, for example, the state is a SRI codepoint which corresponds a selected SRS resource set. The state can be a state of spatial relationship information. The spatial relationship information includes reference signal on which the spatial filter of PUSCH/PUCCH/SRS is based. The state includes QCL reference signal of downlink channel or signal.

In some implementations, the SSB list can be replaced with a first typed reference signal list, wherein the first typed reference signal includes at least one of SSB, TRS, or others. When the first typed reference signal corresponding to a new TCI state activated by a first MAC-CE is in the first typed reference signal list, the new TCI state can be applied for PDSCH/PDCCH/PUSCH/PUCCH without waiting for the first transmission of the first typed reference signal corresponding to the new TCI state as shown in FIG. 3 or 4 except the first transmission of SSB is replaced with the first transmission of the first typed reference signal. When the first typed reference signal corresponding to a new TCI state isn't in the first typed reference signal list, the new TCI state can be applied for PDSCH/PDCCH/PUSCH/PUCCH after waiting for the first transmission the first typed reference signal corresponding to the new TCI state as shown in FIG. 1 or 2 except the first transmission of SSB is replaced with the first transmission of the first typed reference signal.

The first typed reference signal corresponding to the TCI state can be determined by one of following method:

Method 1: If the reference signal in a TCI state is TRS (CSI-RS for tracking), the first typed reference signal corresponding to the TCI state is the TRS, otherwise, the first typed reference signal corresponding to the TCI state is the SSB which is in the TCI state or is QCL-ed with respect to the QCL-TypeA or QCL-TypeC to the TCI state.

Method 2: If there is a TRS which is in the TCI state or QCL-ed with respect with the QCL-TypeA or QCL-TypeC to the TCI state, the first typed reference signal corresponding to the TCI state is the TRS, otherwise, the first typed reference signal corresponding to the TCI state is the SSB which is in the TCI state or is QCL-ed with respect with the QCL-TypeA or QCL-TypeC to the TCI state.

Method 3: The first typed reference signal corresponding to the TCI state is TRS or SSB. It depends whose first transmission is first. If the first transmission of TRS is before the first transmission of SSB, The first typed reference signal corresponding to the TCI state is TRS, otherwise, it is SSB. The first typed reference signal is in the TCI state or is QCL-ed with respect with the QCL-TypeA or QCL-TypeC to the TCI state.

In some implementations, if the UE has reported a PMI/CQI for the reference in the TCI state, the new TCI state can be applied for PDSCH/PDCCH/PUSCH/PUCCH without waiting for the first transmission of the first typed reference signal corresponding to the new TCI state as shown in FIG. 3 or 4.

Figure 12:
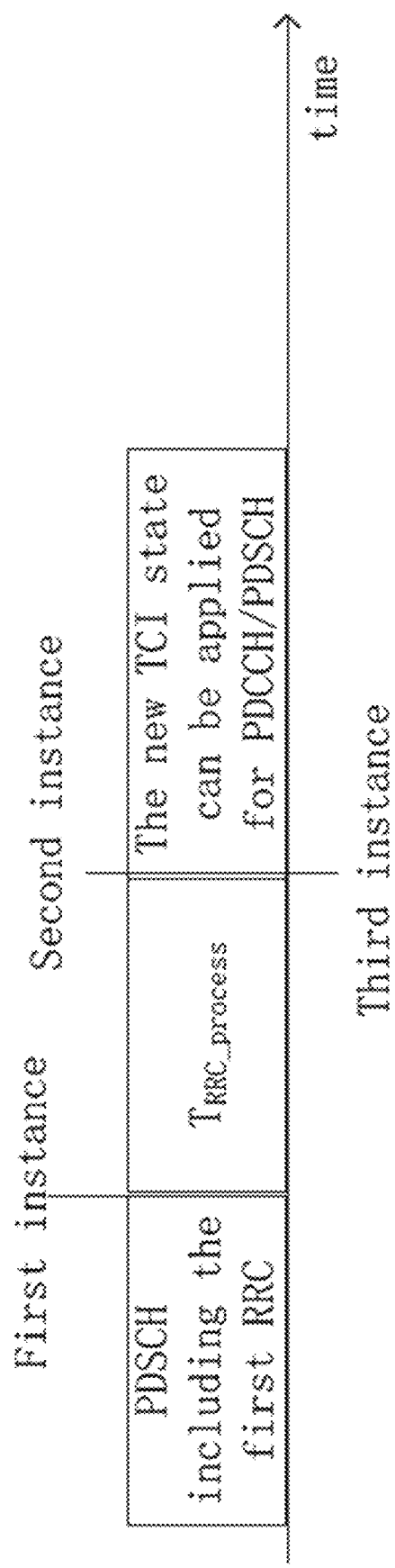
FIGS. 12 and 13 show operations of a user device based on some implementations of the disclosed technology in case that a new TCI (Transmission Configuration Indication) state is applied without waiting for a transmission of a synchronization signal block (SSB) corresponding to the new TCI state, wherein the new TCI state is in a radio resource control (RRC) signaling.
Figure 13:
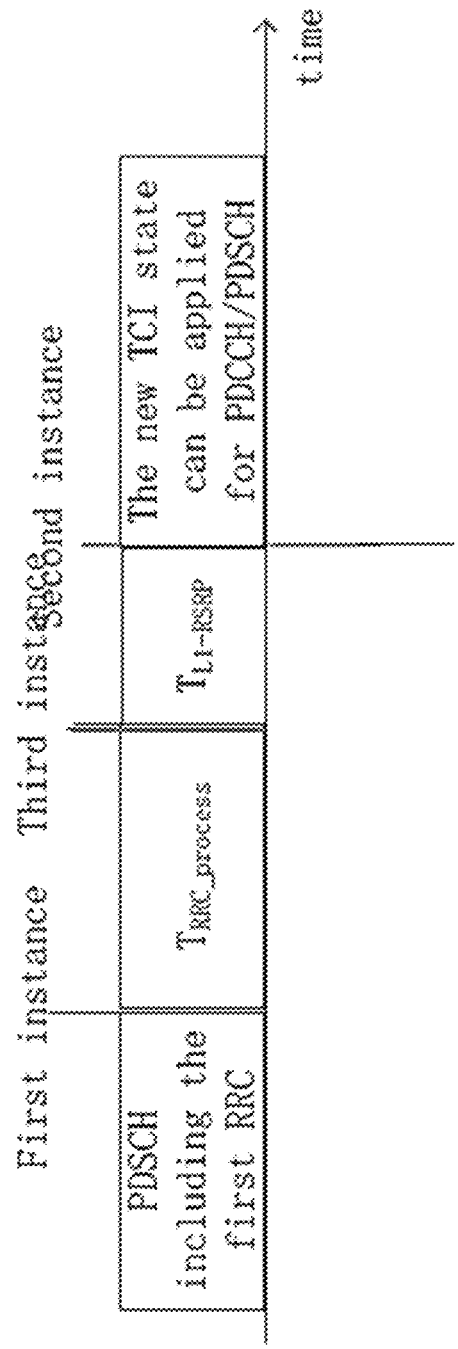
Figure 14:
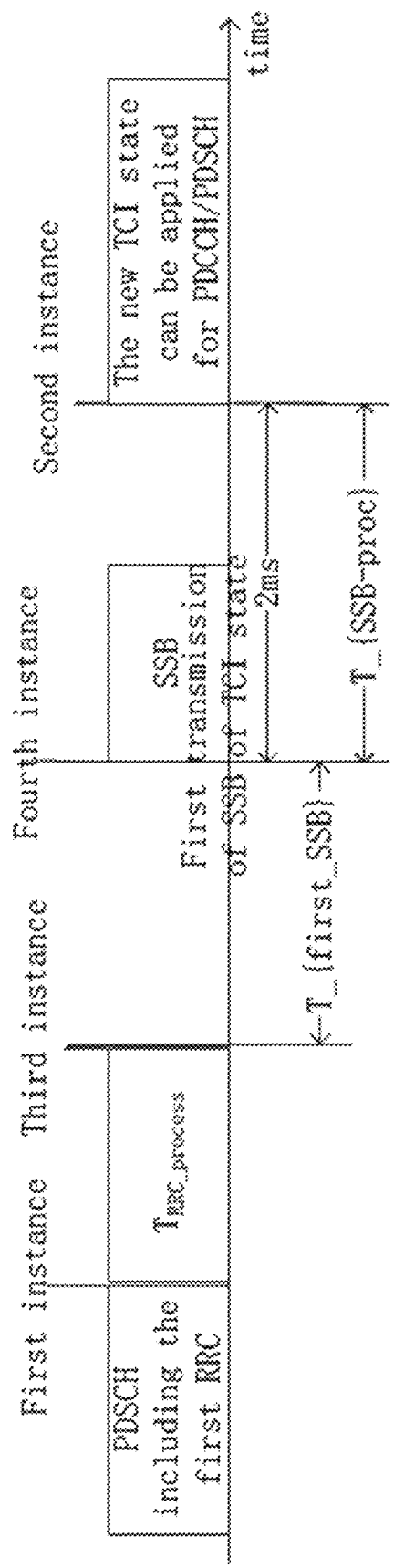
FIGS. 14 and 15 operations of a user device in case that a new TCI (Transmission Configuration Indication) state is applied after a transmission of a synchronization signal block (SSB) corresponding to the new TCI state, wherein the new TCI state is in a RRC signaling.
Figure 15:
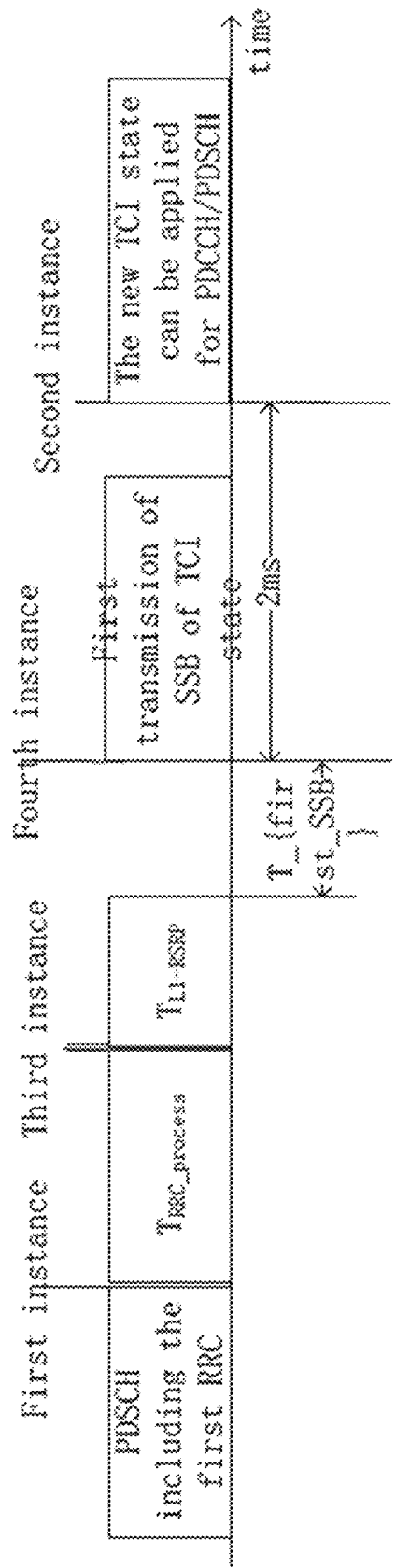

Above includes the delay of applying TCI state updated by MAC-CE. The above process can be similarly used to determine the delay of applying TCI state included in a RRC signaling. For example, if the first reference signal corresponding to the new TCI state is in a second list of the first reference signals, the new TCI state included in the RRC signaling can be applied for the PDSCH/PDCCH/PUSCH/PUCCH without waiting for a first transmission of the first reference signal corresponding to the new TCI state as shown in FIG. 12 or 13, otherwise, the new TCI state included in the RRC signaling can be applied for the PDSCH/PDCCH/PUSCH/PUCCH with waiting for a first transmission of the first reference signal corresponding to the new TCI state as shown in FIG. 14 or 15. Applying a new TCI state for one or more elements can mean one of following: the new TCI state is an activated TCI state of the element; mapping between the TCI states in the MAC-CE and codepoints in a DCI is applied, the codepoint is used to indicate the TCI state of the elements, the new TCI state is a candidate TCI state for the element, the UE has the capability to apply the new TCI state for the element, the UE has the capability to receive a PDCCH with the new TCI state for the element.

In FIGS. 12 and 14, the new TCI state in the RRC signaling is known. In FIGS. 13 and 15, the new TCI state in the RRC is unknown. In FIGS. 12 to 15, $T_{RRC\_processing}$ is the RRC processing delay. The list of first typed reference signals corresponding to the RRC signaling and the list of first typed reference signals corresponding to the RRC signaling can be the same or different.

Example 2

The UE determines a type of a TCI state according to whether the UE reports a CSI reporting (e.g., the first typed CSI reporting) for the RS resource corresponding to the TCI state. The RS resource corresponding to the TCI state is the RS resource in the TCI state or QCLed to the TCI state. The type of a TCI state may be known and unknown.

The TCI state is known if one or more conditions are met, otherwise, the TCI state is unknown. The condition includes that during the period from the last transmission of the RS resource to the completion of an active TCI state switch for the TCI state, the TCI state switch command is received within a second predefined time length upon the last transmission of the RS resource for beam reporting or measurement and the UE has sent at least one CSI report for the TCI state before the TCI state switch command, and the TCI state remains detectable during the TCI state switching period and the SSB associated with the TCI state remain detectable during the TCI switching period, e.g., SNR of the TCI state≥−3 dB. The UE has sent at least 1 CSI report for the TCI state before the TCI state switch command includes the UE has reported at least one of L1-RSRP/L1-SINR/CQI/PMI/RI/L3-RSRP/L3-SINR for the TCI state.

If the TCI state is unknown, the interval between the time that the TCI state switch command including the TCI state is received and the applied time of the TCI state includes $T_{L1-RSRP}$, otherwise the interval doesn't includes $T_{L1-RSRP}$.

The TCI state switch command includes a MAC-CE including the TCI state, or a RRC signaling including the TCI state.

Figure 16:
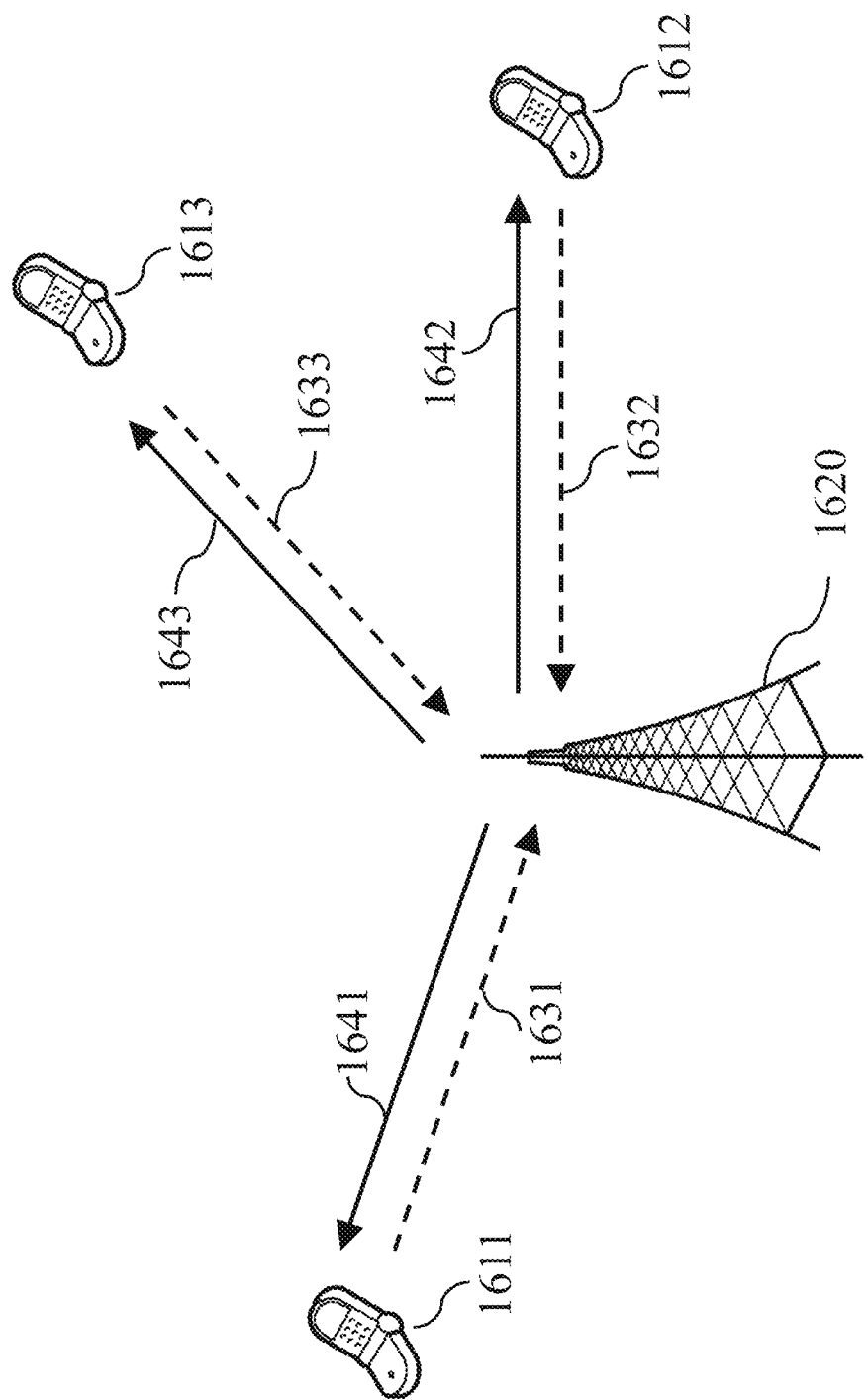
FIG. 16 shows an example of wireless communication including a base station (BS) and user equipment (UE) based on some implementations of the disclosed technology.

The implementations as discussed above will apply to a wireless communication. FIG. 16 shows an example of a wireless communication system (e.g., a 5G or NR cellular network) that includes a BS 1620 and one or more user equipment (UE) 1611, 1612 and 1613. In some embodiments, the UEs access the BS (e.g., the network) using implementations of the disclosed technology (1631, 1632, 1633), which then enables subsequent communication (1641, 1642, 1643) from the BS to the UEs. The UE may be, for example, a smartphone, a tablet, a mobile computer, a machine to machine (M2M) device, an Internet of Things (IoT) device, and so on.

Figure 17:
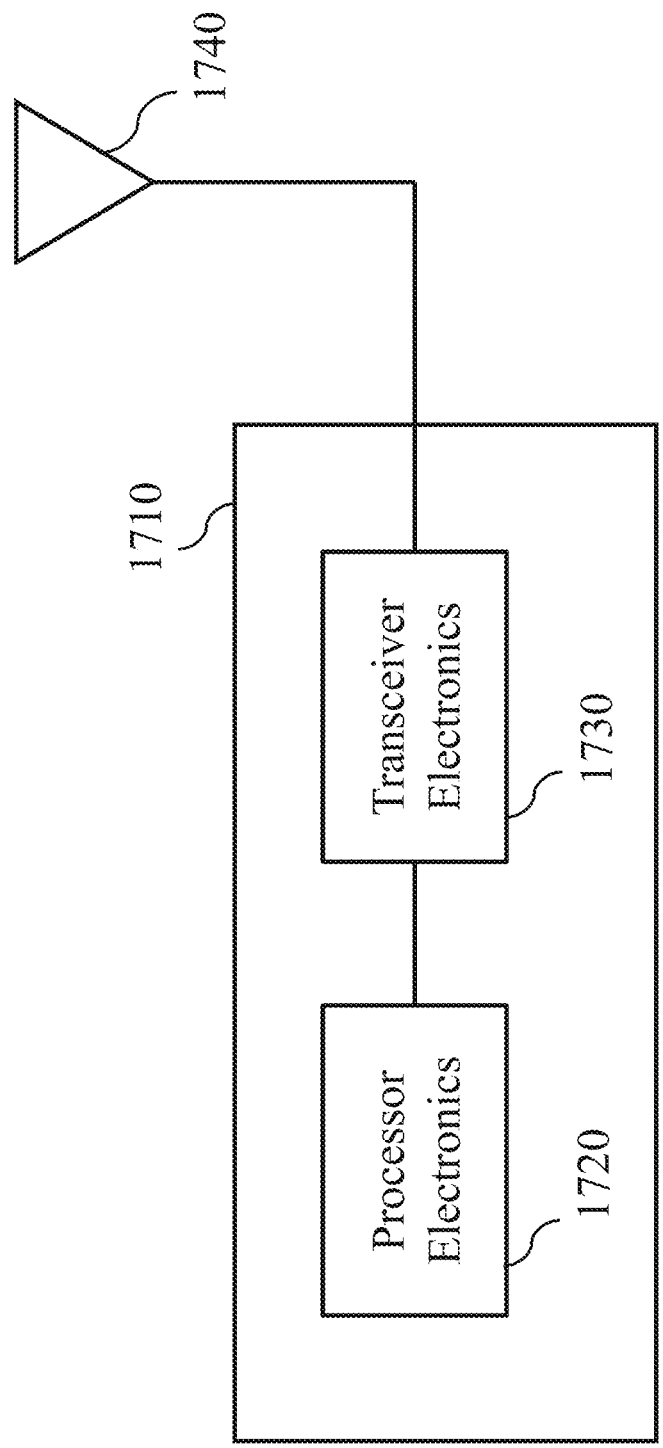
FIG. 17 shows an example of a block diagram of a portion of an apparatus based on some implementations of the disclosed technology.

FIG. 17 shows an example of a block diagram representation of a portion of an apparatus. An apparatus 1710 such as a base station or a wireless device (or UE) can include processor electronics 1720 such as a microprocessor that implements one or more of the techniques presented in this document. The apparatus 1710 can include transceiver electronics 1730 to send and/or receive wireless signals over one or more communication interfaces such as antenna 1740. The apparatus 1710 can include other communication interfaces for transmitting and receiving data. The apparatus 1710 can include one or more memories (not explicitly shown) configured to store information such as data and/or instructions. In some implementations, the processor electronics 1720 can include at least a portion of transceiver electronics 1730. In some embodiments, at least some of the disclosed techniques, modules or functions are implemented using the apparatus 1710.

Figure 18A:
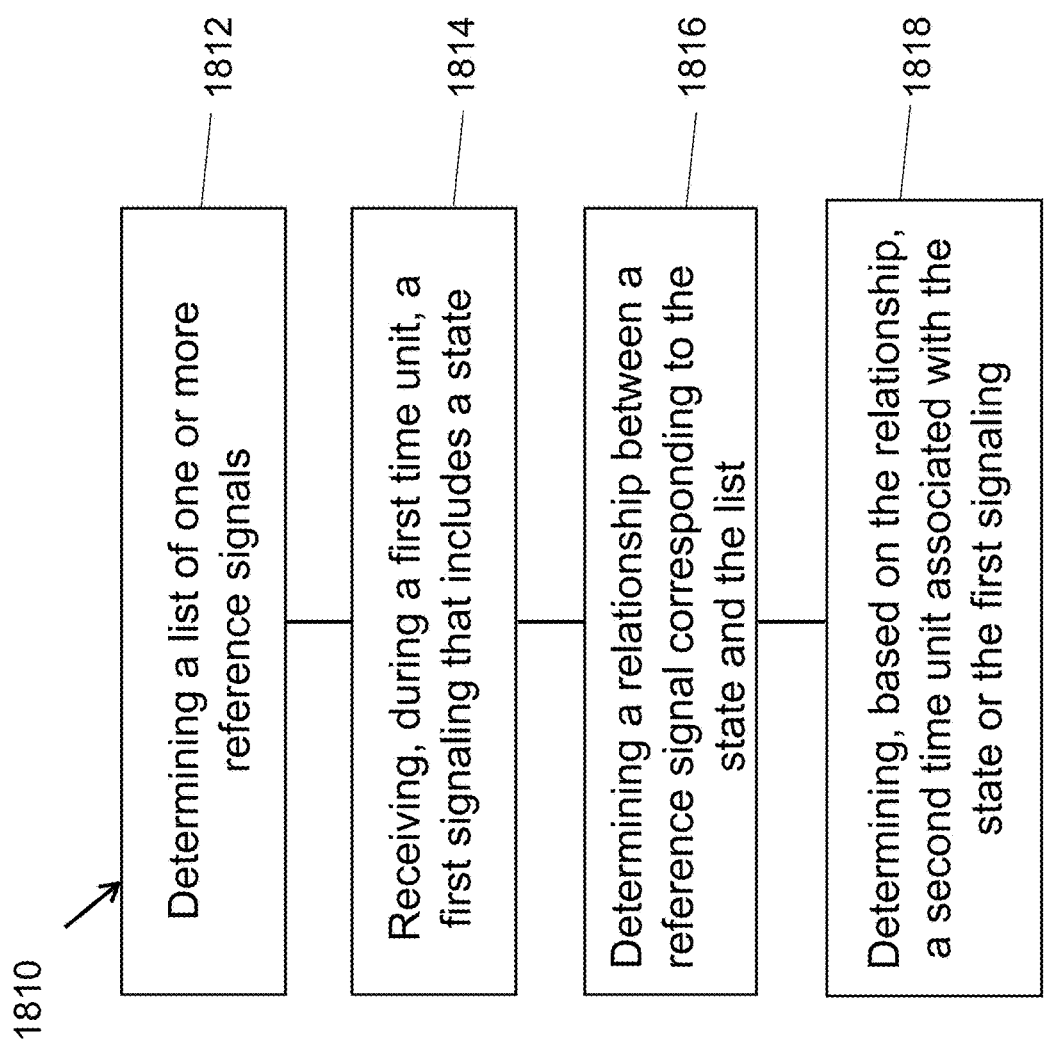
FIGS. 18A to 18C show example flowcharts of wireless communication methods based on some implementations of the disclosed technology.

FIG. 18A shows an example of a wireless communication scheme based on some implementations of the disclosed technology. The method 1810 includes, at step 1812, determining a list of one or more reference signals. The method 1810, further includes, at step 1814, receiving, during a first time unit, a first signaling that includes a state. The method 1810, further includes, at step 1816, determining a relationship between a reference signal corresponding to the state and the list. The method 1810 further includes, at step 1818, determining, based on the relationship, a second time unit associated with the state or the first signaling.

Figure 18B:
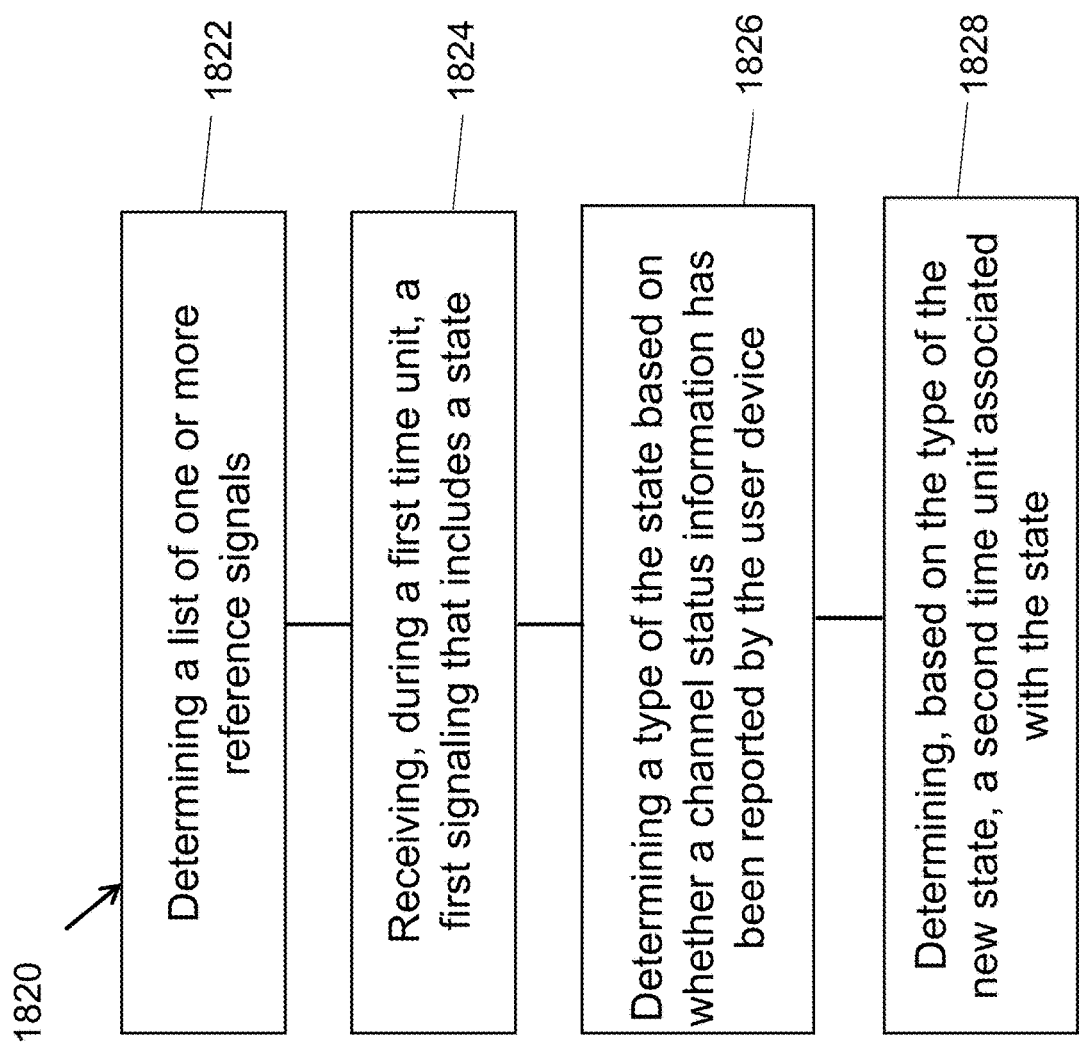

FIG. 18B shows an example of a wireless communication scheme based on some implementations of the disclosed technology. The method 1820 includes, at step 1822, determining a list of one or more reference signals. The method 1820 further includes, at step 1824, receiving, during a first time unit, a first signaling that includes a state. The method 1820 further includes, at step 1826, determining a type of the state based on whether a channel status information about a resource corresponding to the state has been reported by the user device. The method 1820 further includes, at step 1828, determining, based on the type of the new state, a second time unit associated with the state.

Figure 18C:
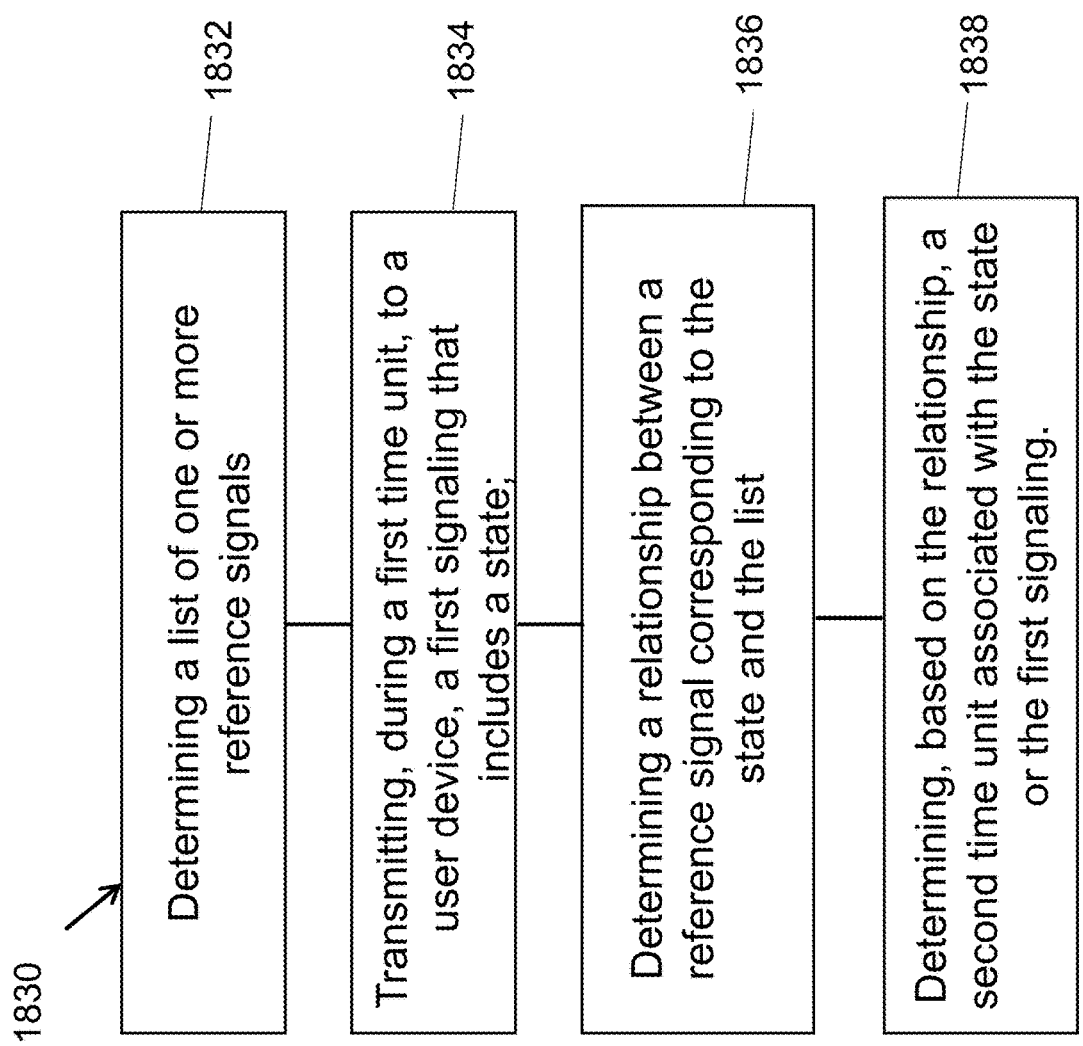

FIG. 18C shows an example of a wireless communication scheme based on some implementations of the disclosed technology. The method 1830 includes, at step 1832, determining a list of one or more reference signals. The method 1830 further includes, at step 1834, transmitting, during a first time unit, to a user device, a first signaling that includes a state. The method 1830 further includes, at step 1836, determining a relationship between a reference signal corresponding to the state and the list. The method 1830 further includes, at step 1838, determining, based on the relationship, a second time unit associated with the state or the first signaling. The determining of the list, the determining of the relationship, and the determining of the second time unit can be performed in the similar manners as discussed for the user device.

Additional features of the above-described methods/techniques that may be preferably implemented in some implementations are described below using a clause-based description format.

1. A method of wireless communication, the method performed by a user device and comprising: determining a list of one or more reference signals; receiving, during a first time unit, a first signaling that includes a state; determining a relationship between a reference signal corresponding to the state and the list; and determining, based on the relationship, a second time unit associated with the state or the first signaling.

2. The method of clause 1, wherein the determining of the relationship includes: determining whether the reference signal is in the list or not.

3. The method of clause 1, where the relationship is determined during a third time unit that is i) after a predefined time length from a time unit including a hybrid automatic repeat request ACK (HARQ-ACK) for a physical downlink shared channel (PDSCH) carrying the first signaling, or ii) after a predefined time length from the first time unit.

4. The method of clause 3, wherein the predefined time length is based on a type of the first signaling.

5. The method of clause 4, wherein the predefined time length is 3 ms for the type of the first signaling being a MAC-control element (MAC-CE), or the predefined time length is a radio resource control (RRC) processing delay for the type of the first signaling being a RRC.

6. The method of clause 1, wherein the determining of the second time unit comprises: determining, based on the relationship, whether a duration for the user device to wait for a first transmission of the reference signal is included in an interval between the first time unit and the second time unit.

7. The method of clause 3, wherein the determining of the second time unit comprises: determining, based on the relationship, whether a duration for the user device to wait for a first transmission of the reference signal is included in the interval between the third time unit and the second time unit.

8. The method of clause 6 or 7, wherein the first transmission of the reference signal occurs after the first signaling is decoded by the user device, or after L1 channel state measurements are done by the user device.

9. The method of clause 6 or 7, wherein the determining determines that the duration for the user device to wait for the first transmission of the reference signal is not included in the interval in case that the reference signal is in the list.

10. The method of clause 6 or 7, wherein the determining determines that the duration for the user device to wait for the first transmission of the reference signal is included in the interval in case that the reference signal is not in the list.

11. The method of clause 8, wherein the L1 measurements include one of L1-RSRP (reference signal received power) measurement, L1-SINR (signal-to-interference-plus-noise ratio) measurement, PMI (Precoding Matrix Indicator) measurement, CQI (Channel Quality Indicator) measurement, or RI (Rank Indicator) measurement.

12. The method of clause 1, further comprising: receiving a second signaling that includes the list.

13. The method of clause 1, wherein the first signaling includes information to update the list.

14. The method of clause 13, wherein the first signaling is a MAC-CE, the state is included in first M states in the MAC-CE, and a reference signal corresponding to any state in the MAC-CE is in the list.

15. The method of clause 12, wherein a new reference signal in the second signaling is added to the list during the second time unit.

16. The method of clause 1, wherein the list is included in information reported by the user device.

17. The method of clause 16, wherein the information reported by the user device is included in one of a third signaling, a CSI (channel status information) reporting, or a UCI (uplink control information).

18. The method of clause 16, wherein a reference signal in the information reported by the user device is in the list during an interval between a fifth instance and a sixth instance, the interval being predefined or determined based on a capability of the user device.

19. The method of clause 16, wherein the fifth instance is one of following: an instance when the user device reports the information, an instance of a last transmission of the reference signal before the user device reports the information, an instance after a predefined time after the user device reports the information, an instance that is after a predefined time from when the user device receives a response for the information, an instance when the user device receives a response for the information, or an instance that is after a predefined time from a last transmission of the reference signal before the user device reports the information.

20. The method of clause 1, wherein the list includes a reference signal corresponding to an active TCI state of the channel that includes one of a physical downlink control channel (PDCCH) in a control resource set (CORESET) or a physical downlink shared channel (PDSCH).

21. The method of clause 1, wherein a reference signal corresponding to an inactive state of a channel is deleted from the list.

22. The method of clause 21, wherein the reference signal corresponding to the inactive TCI state does not correspond to any active state of the channel.

23. The method of clause 1, wherein the list is based on a capability reported by the user device.

24. The method of clause 1, wherein a first reference signal in the list is associated with a parameter that includes at least one of a physical cell identifier (PCI), frequency location, or measurement object identifier (measureObjectID).

25. The method of any of clause 1 to 24, wherein the reference signal and the one or more reference signal comprises at least one of SSB (synchronization signals block) or TRS (CSI-RS for tracking).

26. The method of any of clause 1 to 24, wherein the reference signal comprises the reference signal in the state or quasi co-located (QCL-ed) to the state.

27. The method of any of clauses 1 to 26, wherein the state includes one of TCI (transmission configuration indication) state, a state of a selected SRS (sounding reference signal) resource set, or a state of spatial relationship information.

28. The method of any of clauses 1 to 26, wherein the state includes one of a QCL reference signal or a spatial relationship reference signal.

29. The method of any of clauses 1 to 28, wherein each of the first to third time units corresponds to one of a slot, a sub-slot, an OFDM symbol, or a sub-frame.

30. The method of any of clauses 1 to 29, wherein the first signaling corresponds to a MAC-CE (control element) or a RRC signaling.

31. The method of any of clauses 1 to 30, wherein the list is associated with a second parameter that includes one of following: a CORESET pool, a serving cell, a serving cell group, the user device, or a type of the first signaling.

32. The method of clause 31, wherein the list is empty in case that the second parameter corresponding to the list is deactivated or is reconfigured.

33. The method of any of clause 1 to 32, wherein the list includes a reference signal that is chosen by the user device during a PRACH (Physical Random Access Channel) process.

34. The method of any of clauses 1 to 32, wherein the second time unit is determined based on at least one of following: a type of new beam state, the type of a target element of the state, or the type of reference resource in the state.

35. The method of any of clauses 1 to 32, wherein the second time unit is determined to satisfy at least one of following: i) applying of the state to an element starts from a time unit that is no later than the second time unit, ii) the state is determined as a candidate state for the element starting from a time unit that is no later than the second time unit, iii) the user device has a capability to receive a PDCCH with the state for the element no later than the second time unit, iv) receiving of the element with the state starts from a time unit that is no later than the second time unit, or v) receiving of a PDCCH with the state for an element starts from a time unit that is no later than the second time unit.

36. The method of any of clauses 1 to 32, wherein applying of the first signaling starts from a time unit that is no later than the second time unit.

37. The method of any of clauses 1 to 32, wherein if the first signaling includes other multiple states, the method further includes: multiple other second time units, each corresponding to the other multiple states, and wherein applying of the first signaling starts from a time unit that is no later than a last second time unit among the second time unit and the multiple other second time units.

38. The method of any of clauses 1 to 32, wherein applying of the first signaling starts from a time unit that is no earlier than a third time unit, wherein the third time unit is i) after a predefined time length from a time unit including a hybrid automatic repeat request ACK (HARQ-ACK) for a physical downlink shared channel (PDSCH) carrying the first signaling in case that the first signaling is a MAC-CE, or ii) after a predefined time length from the first time unit in case that the first signaling is a RRC.

39. The method of any of clauses 1 to 32, wherein the state is a new state in the first signaling.

40. The method of any of clauses 1 to 32, wherein the list is empty before the user device is configured a C-RNTI (Cell Radio Network Temporary Identity) and before the user device transmits a first preamble.

41. A method of wireless communication, the method performed by a user device and comprising: determining a list of one or more reference signals; receiving, during a first time unit, a first signaling that includes a state; determining a type of the state based on whether a channel status information about a resource corresponding to the state has been reported by the user device; and determining, based on the type of the new state, a second time unit associated with the state.

42. The method of clause 41, wherein the channel status information is for the state.

43. The method of clause 41, wherein the channel status information is based on a reference signal that is in the new state or quasi co-located (QCL-ed) to the state.

44. The method of clause 41, wherein the type of the state is determined as known in case that the user device has reported the channel status information before the first signaling, and/or the type of the new state is determined as unknown in case that the user device hasn't reported the channel status information before the first signaling.

45. The method of any of clauses 41 to 44, wherein the channel status information includes at least one of following: L1-RSRP, L1-SINR, L3-RSRP, L3-SINR, PMI, RI, or CQI.

46. The method of any of clauses 41 to 44, wherein the state includes one of TCI (transmission configuration indication) state, a state of a selected SRS (sounding reference signal) resource set, or a state of spatial relationship information.

47. The method of any of clauses 41 to 44, wherein the second time unit is determined to satisfy at least one of following: i) applying of the state to an element starts from a time unit that is no later than the second time unit, ii) the state is determined as a candidate state for the element starting from a time unit that is no later than the second time unit, iii) the user device has a capability to receives a PDCCH with the state for the element no later than the second time unit, iv) receiving of the element with the state starts from a time unit that is no later than the second time unit, v) receiving of a PDCCH with the state for an elements starts from a time unit that is no later than the second time unit.

48. A wireless communication method, the method performed by a network device and comprising: determining a list of one or more reference signals; transmitting, during a first time unit, to a user device, a first signaling that includes a state; and determining a relationship between a reference signal corresponding to the state and the list; and determining, based on the relationship, a second time unit associated with the state or the first signaling.

49. The method of clause 48, wherein the relationship is determined during a third time unit that is i) after a predefined time length from a time unit including a HARQ-ACK for a physical downlink shared channel (PDSCH) carrying the first signaling, or ii) after a predefined time length from the first time unit.

50. The method of clause 48, further comprising: transmitting an element with the state after a first transmission of the reference signal in case that the reference signal is not included in the list, the elements including a channel or a signal.

51. The method of clause 48, wherein further comprising: transmitting an element with the state without a first transmission of the reference signal in case that the reference signal is included in the list, the elements including a channel or a signal.

52. The method of clause 48, wherein whether a duration for the user device to wait for a first transmission of the reference signal is included in an interval between the first time unit and the second time unit is determined based on the relationship.

53. The method of clause 49, wherein whether a duration for the user device to wait for a first transmission of the reference signal is included in an interval between the third time unit and the second time unit is determined based on the relationship.

54. The method of clause 52 or 53, wherein the first transmission of the reference signal occurs after the first signaling is decoded by the user device, or after L1 channel state measurements are done by the user device.

55. The method of clause 52 or 53, wherein the duration for the user device to wait for the first transmission of the reference signal is not included in the interval in case that the reference signal is in the list.

56. The method of clause 52 or 53, wherein t the duration for the user device to wait for the first transmission of the reference signal is included in the interval in case that the reference signal is not in the list.

57. The method of clause 48, further comprising: transmitting a second signaling which includes the list.

58. The method of clause 57, wherein the first signaling includes information to update the list.

59. The method of clause 59, wherein the first signaling is a MAC-CE, the state is included in first M states in the MAC-CE, and a reference signal corresponding to any state in the MAC-CE is in the list.

60. The method of clause 48, wherein the list is included in information received from the user device.

61. The method of clause 60, wherein the information received from the user device is included in one of a third signaling, a CSI (channel status information) reporting, or a UCI (uplink control information).

62. The method of clause 60, wherein a reference signal in the information received from the user device is in the list during an interval between a fifth instance and a sixth instance, the interval being predefined or determined based on a capability of the user device.

63. The method of clause 62, wherein the fifth instance is one of following: an instance when the user device reports the information, an instance of a last transmission of the reference signal before the user device reports the information, an instance after a predefined time after the user device reports the information, an instance that is after a predefined time from when the user device receives a response for the information, an instance when the user device receives a response for the information, or an instance that is after a predefined time from a last transmission of the reference signal before the user device reports the information.

64. The method of clause 48, wherein the list includes a reference signal corresponding to an active TCI state of the channel that includes one of a physical downlink control channel (PDCCH) in a control resource set (CORESET) or a physical downlink shared channel (PDSCH).

65. The method of clause 48, wherein a reference signal corresponding to an inactive state of a channel is deleted from the list.

66. The method of clause 65, wherein the reference signal corresponding to the inactive TCI state does not correspond to any active state of the channel.

67. The method of clause 48, wherein the list is based on a capability received from the user device.

68. The method of clause 48, wherein a first reference signal in the list is associated with a parameter that includes at least one of a physical cell identifier (PCI), frequency location, or measurement object identifier (measureObjectID).

69. The method of any of clauses 48 to 68, wherein the second time unit is determined to satisfy at least one of following: i) applying of the state to an element starts from a time unit that is no later than the second time unit, ii) the state is determined as a candidate state for the element starting from a time unit that is no later than the second time unit, iii) a determination that a user device has a capability to receives a PDCCH with the state for the element is made no later than the second time unit, iv) transmitting of the element with the state starting from a time unit that is no later than the second time unit, v) transmitting of a PDCCH with the state for the elements starts from a time unit that is no later than the second time unit.

70. The method of any of clauses 48 to 68, wherein applying of the first signaling starts from a time unit that is no later than the second time unit.

71. The method of any of clauses 48 to 68, wherein applying of the first signaling starts from a time unit that is no earlier than a third time unit, wherein the third time unit is i) after a predefined time length from a time unit including a hybrid automatic repeat request ACK (HARQ-ACK) for a physical downlink shared channel (PDSCH) carrying the first signaling in case that the first signaling is a MAC-CE, or ii) after a predefined time length from the first time unit in case that the first signaling is a RRC.

72. A communication apparatus comprising a processor configured to implement a method recited in any one or more of clauses 1 to 71.

73. A computer readable medium having code stored thereon, the code, when executed, causing a processor to implement a method recited in any one or more of clauses 1 to 71.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, the method performed by a user device and comprising:
    reporting a capability information to a network device;
    determining a list of one or more reference signals, wherein a maximum number of the one or more reference signals of the list is included in the capability information;
    receiving, during a first time unit, a first signaling that includes a state including a quasi-co-location (QCL) reference signal;
    determining a relationship between a reference signal corresponding to the state and the list by determining whether the reference signal is in the list; and
    determining, based on the relationship, a second time unit associated with the state or the first signaling,
    wherein the determining of the second time unit comprises determining, based on the relationship, whether a duration for the user device to wait for a first transmission of the reference signal is included in an interval between the first time unit and the second time unit,
    wherein the duration for the user device to wait for the first transmission of the reference signal is not included in the interval in response to the determining that the reference signal is in the list and the duration for the user device to wait for the first transmission of the reference signal is included in the interval in response to the determining that the reference signal is not in the list,
    wherein the reference signal is added to the list in the second time unit in response to the determining that the reference signal is not in the list, and a reference signal corresponding to an inactive transmission configuration indication (TCI) state of a channel is deleted from the list, and
    wherein applying of the first signaling starts from a time unit that is no later than the second time unit, and the reference signal added to the list and the one or more reference signals comprise at least one of a synchronization signal block (SSB) or a tracking reference signal, TRS, of a channel state information reference signal (CSI-RS) for tracking.

2. The method of claim 1, wherein the relationship is determined during a third time unit that is i) after a predefined time length from a time unit including a hybrid automatic repeat request ACK (HARQ-ACK) for a physical downlink shared channel (PDSCH) carrying the first signaling, or ii) after a predefined time length from the first time unit.

3. The method of claim 1, further comprising: receiving a second signaling that includes the list, wherein a new reference signal in the second signaling is added to the list during the second time unit.

4. The method of claim 1, wherein the list is included in information reported by the user device, and wherein the information reported by the user device is included in 1) one of a third signaling, a CSI (channel status information) reporting, or a UCI (uplink control information), 2) the list during an interval between a fifth instance and a sixth instance, the interval being predefined or determined based on a capability of the user device.

5. The method of claim 1, wherein the list includes a reference signal corresponding to an active TCI state of the channel that includes one of a physical downlink control channel (PDCCH) in a control resource set (CORESET) or a physical downlink shared channel (PDSCH).

6. The method of claim 1, wherein the list is based on the capability information reported by the user device and wherein the list is associated with a second parameter that includes one of following: a CORESET pool, a serving cell, a serving cell group, the user device, or a type of the first signaling.

7. The method of claim 1, wherein the second time unit is determined based on at least one of following: a type of new beam state, the type of a target element of the state, or the type of reference resource in the state and, wherein the second time unit is determined to satisfy at least one of following: i) applying of the state to an element starts from a time unit that is no later than the second time unit, ii) the state is determined as a candidate state for the element starting from a time unit that is no later than the second time unit, iii) the user device has a capability to receive a PDCCH with the state for the element no later than the second time unit, iv) receiving of the element with the state starts from a time unit that is no later than the second time unit, or v)

receiving of a PDCCH with the state for an element starts from a time unit that is no later than the second time unit.

8. A method of wireless communication, the method performed by a network device and comprising:
  receiving a capability information from a user device;
  determining a list of one or more reference signals, wherein a maximum number of the one or more reference signals of the list is included in the capability information;
  transmitting, during a first time unit, to the user device, a first signaling that includes a state including a quasi-co-location (QCL) reference signal;
  determining a relationship between a reference signal corresponding to the state and the list by determining whether the reference signal is in the list; and
  determining, based on the relationship, a second time unit associated with the state or the first signaling,
  wherein the determining of the second time unit comprises determining, based on the relationship, whether a duration for the user device to wait for a first transmission of the reference signal is included in an interval between the first time unit and the second time unit,
  wherein the duration for the user device to wait for the first transmission of the reference signal is not included in the interval in response to the determining that the reference signal is in the list and the duration for the user device to wait for the first transmission of the reference signal is included in the interval in response to the determining that the reference signal is not in the list,
  wherein the reference signal is added to the list in the second time unit in response to the determining that the reference signal is not in the list, and a reference signal corresponding to an inactive transmission configuration indication (TCI) state of a channel is deleted from the list, and
  wherein applying of the first signaling starts from a time unit that is no later than the second time unit, and the reference signal added to the list and the one or more reference signals comprise at least one of a synchronization signal block (SSB) or a tracking reference signal, TRS, of a channel state information reference signal (CSI-RS) for tracking.

9. The method of claim 8, further comprising:
  transmitting an element with the state after a first transmission of the reference signal in case that the reference signal is not included in the list, the elements including a channel or a signal, or
  transmitting an element with the state without waiting for a first transmission of the reference signal in case that the reference signal is included in the list, the elements including a channel or a signal.

10. The method of claim 8,
  wherein the relationship is determined during a third time unit that is i) after a predefined time length from a time unit including a hybrid automatic repeat request ACK (HARQ-ACK) for a physical downlink shared channel (PDSCH) carrying the first signaling, or ii) after a predefined time length from the first time unit.

11. The method of claim 8, further comprising: transmitting a second signaling which includes the list.

12. The method of claim 8, wherein the first signaling includes information to update the list and wherein the first signaling is a MAC-CE, the state is included in first M states in the MAC-CE, and a reference signal corresponding to any state in the MAC-CE is in the list.

13. The method of claim 8, wherein the list is included in information received from the user device, and wherein a reference signal in the information received from the user device is in the list during an interval between a fifth instance and a sixth instance, the interval being predefined or determined based on a capability of the user device.

14. A communication apparatus comprising at least one processor configured to cause the communication apparatus to:
  report a capability information to a network device;
  determine a list of one or more reference signals, wherein a maximum number of the one or more reference signals of the list is included in the capability information;
  receive, during a first time unit, a first signaling that includes a state including a quasi-co-location (QCL) reference signal;
  determine a relationship between a reference signal corresponding to the state and the list by determining whether the reference signal is in the list; and
  determine, based on the relationship, a second time unit associated with the state or the first signaling, and
  wherein the determining of the second time unit comprises determining, based on the relationship, whether a duration for the communication apparatus to wait for a first transmission of the reference signal is included in an interval between the first time unit and the second time unit,
  wherein the duration for the communication apparatus to wait for the first transmission of the reference signal is not included in the interval in response to the determining that the reference signal is in the list and the duration for the communication apparatus to wait for the first transmission of the reference signal is included in the interval in response to the determining that the reference signal is not in the list, and
  wherein the reference signal is added to the list in the second time unit in response to the determining that the reference signal is not in the list, and a reference signal corresponding to an inactive transmission configuration indication (TCI) state of a channel is deleted from the list, and
  wherein applying of the first signaling starts from a time unit that is no later than the second time unit, and the reference signal added to the list and the one or more reference signals comprise at least one of a synchronization signal block (SSB) or a tracking reference signal, TRS, of a channel state information reference signal (CSI-RS) for tracking.

15. The communication apparatus of claim 14,
  wherein the relationship is determined during a third time unit that is i) after a predefined time length from a time unit including a hybrid automatic repeat request ACK (HARQ-ACK) for a physical downlink shared channel (PDSCH) carrying the first signaling, or ii) after a predefined time length from the first time unit.

16. A communication apparatus comprising at least one processor configured to cause the communication apparatus to:
  receive a capability information from a user device;
  determine a list of one or more reference signals, wherein a maximum number of the one or more reference signals of the list is included in the capability information;
  transmit, during a first time unit, to the user device, a first signaling that includes a state including a quasi-co-location (QCL) reference signal; and determine a relationship between a reference signal corresponding to the state and the list by determining whether the reference signal is in the list; and determine, based on the relationship, a second time unit associated with the state or the first signaling, and wherein the determining of the second time unit comprises determining, based on the relationship, whether a duration for the user device to wait for a first transmission of the reference signal is included in an interval between the first time unit and the second time unit, wherein the duration for the user device to wait for the first transmission of the reference signal is not included in the interval in response to the determining that the reference signal is in the list and the duration for the user device to wait for the first transmission of the reference signal is included in the interval in response to the determining that the reference signal is not in the list, and wherein the reference signal is added to the list in the second time unit in response to the determining that the reference signal is not in the list, and a reference signal corresponding to an inactive transmission configuration indication (TCI) state of a channel is deleted from the list, and wherein applying of the first signaling starts from a time unit that is no later than the second time unit, and the reference signal added to the list and the one or more reference signals comprise at least one of a synchronization signal block (SSB) or a tracking reference signal, TRS, of a channel state information reference signal (CSI-RS) for tracking.

17. The communication apparatus of claim 16, wherein the at least one processor is further configured to:

transmit an element with the state after a first transmission of the reference signal in case that the reference signal is not included in the list, the elements including a channel or a signal, or transmit an element with the state without waiting for a first transmission of the reference signal in case that the reference signal is included in the list, the elements including a channel or a signal.

* * * * *